(12) United States Patent
Saiki et al.

(10) Patent No.: US 12,265,374 B2
(45) Date of Patent: Apr. 1, 2025

(54) JOB SELECTION SYSTEM AND JOB SELECTION METHOD

(71) Applicant: KOBELCO CONSTRUCTION MACHINERY CO., LTD., Hiroshima (JP)

(72) Inventors: Seiji Saiki, Hiroshima (JP); Hitoshi Sasaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 848 days.

(21) Appl. No.: 17/291,121

(22) PCT Filed: Oct. 7, 2019

(86) PCT No.: PCT/JP2019/039546
§ 371 (c)(1),
(2) Date: May 4, 2021

(87) PCT Pub. No.: WO2020/095601
PCT Pub. Date: May 14, 2020

(65) Prior Publication Data
US 2022/0004166 A1 Jan. 6, 2022

(30) Foreign Application Priority Data
Nov. 9, 2018 (JP) .................................. 2018-211264

(51) Int. Cl.
*G05B 19/4155* (2006.01)
*G06F 16/00* (2019.01)
(Continued)

(52) U.S. Cl.
CPC ......... *G05B 19/4155* (2013.01); *G06F 16/00* (2019.01); *G06Q 10/02* (2013.01);
(Continued)

(58) Field of Classification Search
CPC ........... G06Q 10/02; G06Q 10/063112; G06Q 50/08; G06Q 30/0645; G06Q 10/06; G05B 19/4155; G06F 16/00
See application file for complete search history.

(56) References Cited

U.S. PATENT DOCUMENTS 8,484,482 B1 4/2013 Cherukumudi et al.
10,326,895 B2 * 6/2019 Kato ................... H04N 1/00347
(Continued)

FOREIGN PATENT DOCUMENTS

| CN | 103901856 A | 7/2014 |
|---|---|---|
| CN | 104649146 A | 5/2015 |

(Continued)

OTHER PUBLICATIONS

International Search Report issued on Dec. 17, 2019 in PCT/JP2019/039546 filed on Oct. 7, 2019, 2 pages.
(Continued)

*Primary Examiner* — Dylan C White
(74) *Attorney, Agent, or Firm* — Oblon, McClelland, Maier & Neustadt, L.L.P.

(57) ABSTRACT

A server causes an information terminal device to display a selection image for allowing an operator to select a desired operation among one or more operations and a desired master device among one or more master devices based on operation request information stored in a first database and master device information stored in a second database. The information terminal device sends to the server a selection instruction of the operator who selects the desired operation and the desired master device via the selection image. The server receives an operation order acceptance of the operator by storing, in an operation plan database, an operator ID, a master device ID and the operation designated by the selection instruction in combination with one another.

7 Claims, 22 Drawing Sheets

(51) Int. Cl.
    *G06Q 10/02*     (2012.01)
    *G06Q 10/06*     (2023.01)
    *G06Q 10/0631*     (2023.01)
    *G06Q 30/0645*     (2023.01)
    *G06Q 50/08*     (2012.01)

(52) U.S. Cl.
    CPC ..... *G06Q 10/06* (2013.01); *G06Q 10/063112* (2013.01); *G06Q 30/0645* (2013.01); *G06Q 50/08* (2013.01); *G05B 2219/36169* (2013.01)

(56) References Cited

U.S. PATENT DOCUMENTS

| | | | |
|---|---|---|---|
| 2009/0248223 A1 | 10/2009 | Ecton et al. | |
| 2010/0241693 A1 | 9/2010 | Ando et al. | |
| 2013/0123980 A1 | 5/2013 | Seo | |
| 2014/0032281 A1* | 1/2014 | Shirado | G06Q 10/06 705/7.42 |
| 2014/0068770 A1 | 3/2014 | Chizeck et al. | |
| 2018/0058038 A1* | 3/2018 | Fredrickson | G05G 1/30 |
| 2018/0218301 A1* | 8/2018 | Shike | G06Q 30/0645 |
| 2018/0284760 A1 | 10/2018 | Gupta et al. | |
| 2021/0073711 A1* | 3/2021 | Saiki | G06Q 10/0639 |
| 2022/0164754 A1* | 5/2022 | Sasaki | G06Q 10/063112 |
| 2022/0247624 A1* | 8/2022 | Johnson | H04L 67/131 |

FOREIGN PATENT DOCUMENTS

| | | |
|---|---|---|
| CN | 206115189 U | 4/2017 |
| EP | 3 767 563 A1 | 1/2021 |
| JP | 2001-351029 A | 12/2001 |
| JP | 2002-101333 A | 4/2002 |
| JP | 2002-108975 A | 4/2002 |
| JP | 2014-235658 A | 12/2014 |
| JP | 2017-22433 A | 1/2017 |
| KR | 10-2014-0119343 A | 10/2014 |
| WO | WO 2005/043433 A1 | 5/2005 |
| WO | WO 2008/140011 A1 | 11/2008 |
| WO | WO 2019/202995 A1 | 10/2019 |
| WO | WO 2019/202996 A1 | 10/2019 |

OTHER PUBLICATIONS

"Password Policy", Wikipedia, The Free Encyclopedia, Jul. 30, 2018, Retrieved from https://en.wikipedia.org/w/index.php?title=Password_policy&oldid=852586985, pp. 1-6, XP093033894.
Japanese Office Action dated Feb. 12, 2025, issued in Japanese Patent Application No. 2024-032932 (with English translation).

* cited by examiner

FIG. 2A

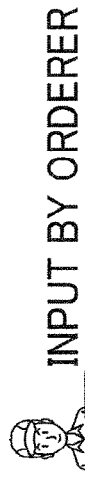

INPUT BY ORDERER

G1 — INPUT OF OPERATION TIME AND REMUNERATION (CONSTRUCTION WORK)

H1 — Machine Information

| SITE NAME | MACHINE TYPE | MACHINE MODEL | ATT | LEADING END ATT |
|---|---|---|---|---|
| SITE A | BACKHOE | SK200-10 | STANDARD | BUCKET |

H2

| JOB ITEM | REQUIRED SKILL LEVEL | |
|---|---|---|
| | LUMP-SUM PAYMENT | HOURLY WAGE |
| EXCAVATION AND LOADING | C | D |
| FLAT GROUND PREPARATION | B | C |
| FLAT GROUND FORMING | A | B |
| SLOPE PREPARATION | S | A |
| SLOPE FORMING | S | S |

| SITE NAME | MACHINE INFORMATION ||| JOB ITEM | REQUIRED SKILL LEVEL || REMUNERATION (JPY) | APRIL 3, 2021 (OPERATION TIME SET) ||||||||||||||||||||||||
|---|---|---|---|---|---|---|---|---|---|---|---|---|---|---|---|---|---|---|---|---|---|---|---|---|---|---|---|---|
| | MACHINE TYPE | MACHINE MODEL | ATT | LEADING END ATT | | | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| SITE A | BACKHOE | SK200-10 | STANDARD | BUCKET | EXCAVATION AND LOADING | LUMP-SUM PAYMENT | C | | | | | | | | | | | | | | | | | | | | | | | | | |
| | | | | | | HOURLY WAGE | D | | | | | | | | | | | | | | | | | | | | | | | | | |
| | | | | | FLAT GROUND PREPARATION | LUMP-SUM PAYMENT | B | | | | | | | | | | | | | | | | | | | | | | | | | |
| | | | | | | HOURLY WAGE | C | | | | | | | | | | | | | | | | | | | | | | | | | |
| | | | | | FLAT GROUND FORMING | LUMP-SUM PAYMENT | A | | | | | | | | | | | | | | | | | | | | | | | | | |
| | | | | | | HOURLY WAGE | B | | | | | | | | | | | | | | | | | | | | | | | | | |
| | | | | | SLOPE PREPARATION | LUMP-SUM PAYMENT | S | | | | | | | | | | | | | | | | | | | | | | | | | |
| | | | | | | HOURLY WAGE | A | | | | | | | | | | | | | | | | | | | | | | | | | |
| | | | | | SLOPE FORMING | LUMP-SUM PAYMENT | S | | | | | | | | | | | | | | | | | | | | | | | | | |
| | | | | | | HOURLY WAGE | S | | | | | | | | | | | | | | | | | | | | | | | | | |

| JOB ITEM | REQUIRED SKILL LEVEL | | REMUNERATION (JPY) | APRIL 3, 2021 (OPERATION TIME SET) ~H3 |
|---|---|---|---|---|
| | | | | Hours 1–24 |
| EXCAVATION AND LOADING | LUMP-SUM PAYMENT | C | 14,400 | shaded: 2–6 |
| | HOURLY WAGE | D | 2,000 | |
| FLAT GROUND PREPARATION | LUMP-SUM PAYMENT | B | 16,560 | shaded: 7–11 |
| | HOURLY WAGE | C | 2,300 | |
| FLAT GROUND FORMING | LUMP-SUM PAYMENT | A | 15,000 | shaded: 12–16 |
| | HOURLY WAGE | B | 2,500 | |
| SLOPE PREPARATION | LUMP-SUM PAYMENT | S | 13,440 | shaded: 17–20 |
| | HOURLY WAGE | A | 2,800 | |
| SLOPE FORMING | LUMP-SUM PAYMENT | S | 10,800 | shaded: 21–24 |
| | HOURLY WAGE | S | 3,000 | |

| MASTER DEVICE ID | MASTER DEVICE NAME | LOCATION | RENTAL FEE |
|---|---|---|---|
| M001 | DEVICE No. 001 | XXX | JPY 1,000/H |
| M002 | DEVICE No. 002 | XXX | JPY 1,400/H |

| SITE NAME | MACHINE INFORMATION | | | | JOB ITEM | REQUIRED SKILL LEVEL | | REMUNERATION (JPY) |
|---|---|---|---|---|---|---|---|---|
| | MACHINE TYPE | MACHINE MODEL | ATT | LEADING END ATT | | | | |
| SITE A | BACKHOE | SK200-10 | STANDARD | BUCKET | EXCAVATION AND LOADING | LUMP-SUM PAYMENT | C | 14,400 |
| | | | | | | HOURLY WAGE | D | 2,000 |
| | | | | | FLAT GROUND PREPARATION | LUMP-SUM PAYMENT | B | 16,560 |
| | | | | | | HOURLY WAGE | C | 2,300 |
| | | | | | FLAT GROUND FORMING | LUMP-SUM PAYMENT | A | 15,000 |
| | | | | | | HOURLY WAGE | B | 2,500 |
| | | | | | SLOPE PREPARATION | LUMP-SUM PAYMENT | S | 13,440 |
| | | | | | | HOURLY WAGE | A | 2,800 |
| | | | | | SLOPE FORMING | LUMP-SUM PAYMENT | S | 10,800 |
| | | | | | | HOURLY WAGE | S | 3,000 |

G51B

| SITE NAME | MACHINE INFORMATION | | | | JOB ITEM | REQUIRED SKILL LEVEL | | REMUNERATION (JPY) |
|---|---|---|---|---|---|---|---|---|
| | MACHINE TYPE | MACHINE MODEL | ATT | LEADING END ATT | | | | |
| SITE B | BACKHOE | SK135-SR-5 | STANDARD | BUCKET | FLAT GROUND FORMING | LUMP-SUM PAYMENT | A | 11,040 |
| | | | | | | HOURLY WAGE | B | 2,300 |
| | | | | | FLAT GROUND PREPARATION | LUMP-SUM PAYMENT | B | 15,120 |
| | | | | | | HOURLY WAGE | C | 2,100 |
| | | | | | FLAT GROUND FORMING | LUMP-SUM PAYMENT | A | 13,800 |
| | | | | | | HOURLY WAGE | B | 2,300 |
| | | | | | EXCAVATION AND LOADING | LUMP-SUM PAYMENT | C | 19,440 |
| | | | | | | HOURLY WAGE | D | 1,800 |

G51C

| SITE NAME | MACHINE INFORMATION | | | | JOB ITEM | REQUIRED SKILL LEVEL | | REMUNERATION (JPY) |
|---|---|---|---|---|---|---|---|---|
| | MACHINE TYPE | MACHINE MODEL | ATT | LEADING END ATT | | | | |
| SITE C | BUILDING DEMOLISHER | SK500-10 | THREE-FOLDED | LARGE NIBBLER | BUILDING DEMOLITION (6 m OR HIGHER) | LUMP-SUM PAYMENT | S | 34,560 |
| | | | | | | HOURLY WAGE | S | 3,200 |
| | | | | | RABBLE LOADING | LUMP-SUM PAYMENT | C | 4,560 |
| | | | | | | HOURLY WAGE | D | 1,900 |

FIG. 7

| OPERATOR INFORMATION | | JOB ITEM | SELECTED TIME SET | | | | | | | | | | | | EXPECTED INCOME (JPY) |
|---|---|---|---|---|---|---|---|---|---|---|---|---|---|---|---|
| ID | NAME | | 7:00 | 8:00 | 9:00 | 10:00 | 11:00 | 12:00 | 13:00 | 14:00 | 15:00 | 16:00 | 17:00 | 18:00 | 19:00 | 20:00 | |
| XXXX-XX | ○○○TARO | FLAT GROUND PREPARATION | | SITE B / HOURLY WAGE 2,100 (W1) | SITE A / HOURLY WAGE 2,300 (W2) | | | | | | | | | | 28,640 |
| | | BUILDING DEMOLITION (6 m OR HIGHER) | | | | | | | | SITE C / HOURLY WAGE 3,200 (W3) | | | | | |
| | | SLOPE PREPARATION | | | | | | | | | | SITE A / LUMP-SUM PAYMENT 13,440 (W4) | | |

W1 → MASTER DEVICE ID M001
W2 → MASTER DEVICE ID M001
W3 → MASTER DEVICE ID M002
W4 → MASTER DEVICE ID M003

| OPERATOR ID | NAME | COUNTRY | EMAIL ADDRESS | PASSWORD |
|---|---|---|---|---|
| XXXXX-XX | | | | |
| XXXXX-XX | | | | |
| XXXXX-XX | | | | |

T1

...

| MACHINE WEIGHT RANGE | ATT TYPE | LEADING END ATT TYPE | SKILL LEVEL |
|---|---|---|---|
| 3t~5t | STANDARD | BUCKET | S |
| 6t~13t | STANDARD | BUCKET | A |
| 3t~5t | LONG-RANGED | BUCKET | A |

ACTUAL JOB PERFORMANCE DB
"MACHINE WEIGHT RANGE: 3t – 5t" × "ATT TYPE: STANDARD" × "LEADING END ATT TYPE: BUCKET"

| JOB ITEM | BASE POINT | × | JOB TIME PERIOD (Hr) | = | EVALUATION SCORE |
|---|---|---|---|---|---|
| EXCAVATION AND LOADING | 1 | × | 60 | = | 60 |
| FLAT GROUND PREPARATION | 2 | × | 10 | = | 20 |
| FLAT GROUND FORMING | 3 | × | 20 | = | 60 |
| SLOPE PREPARATION | 3 | × | 15 | = | 45 |
| SLOPE FORMING | 5 | × | 45 | = | 225 |

AUTOMATICALLY INPUT IN ACCORDANCE WITH ACTUAL PERFORMANCE

FIG. 10

| MACHINE WEIGHT RANGE (H141) | ATT TYPE (H142) | LEADING END ATT TYPE (H143) |
|---|---|---|
| 3t~5t | STANDARD | BUCKET |
| 6t~13t | LONG-RANGED | ROTATABLE GRAPPLE |
| 14t~26t | SEPARATED | MECHANICAL GRAPPLE |
| 27t~50t | THREE-FOLDED | SMALL NIBBLER |
| 50t OR HEAVIER | SHORT-ARMED | LARGE NIBBLER |

FIG. 11

ACTUAL SIMULATOR PERFORMANCE DB

111

| JOB ITEM | BASE POINT | × | JOB TIME PERIOD (Hr) | = | EVALUATION SCORE |
|---|---|---|---|---|---|
| EXCAVATION AND LOADING | 1 | × | 82 | = | 82 |
| FLAT GROUND PREPARATION | 2 | × | 27 | = | 54 |
| FLAT GROUND FORMING | 3 | × | 15 | = | 45 |
| SLOPE PREPARATION | 3 | × | 8 | = | 24 |
| SLOPE FORMING | 5 | × | 14 | = | 70 |

AUTOMATICALLY INPUT IN ACCORDANCE WITH ACTUAL PERFORMANCE

ACTUAL EXAMINATION PERFORMANCE DB

| EXAMINATION ITEM | BASE POINT | × | JUDGMENT RESULT | = | EVALUATION SCORE |
|---|---|---|---|---|---|
| EXCAVATION AND LOADING | 50 | × | 1 | = | 50 |
| FLAT GROUND PREPARATION | 100 | × | 1 | = | 150 |
| FLAT GROUND FORMING | 150 | × | 0 | = | 0 |

AUTOMATICALLY INPUT IN ACCORDANCE WITH ACTUAL PERFORMANCE

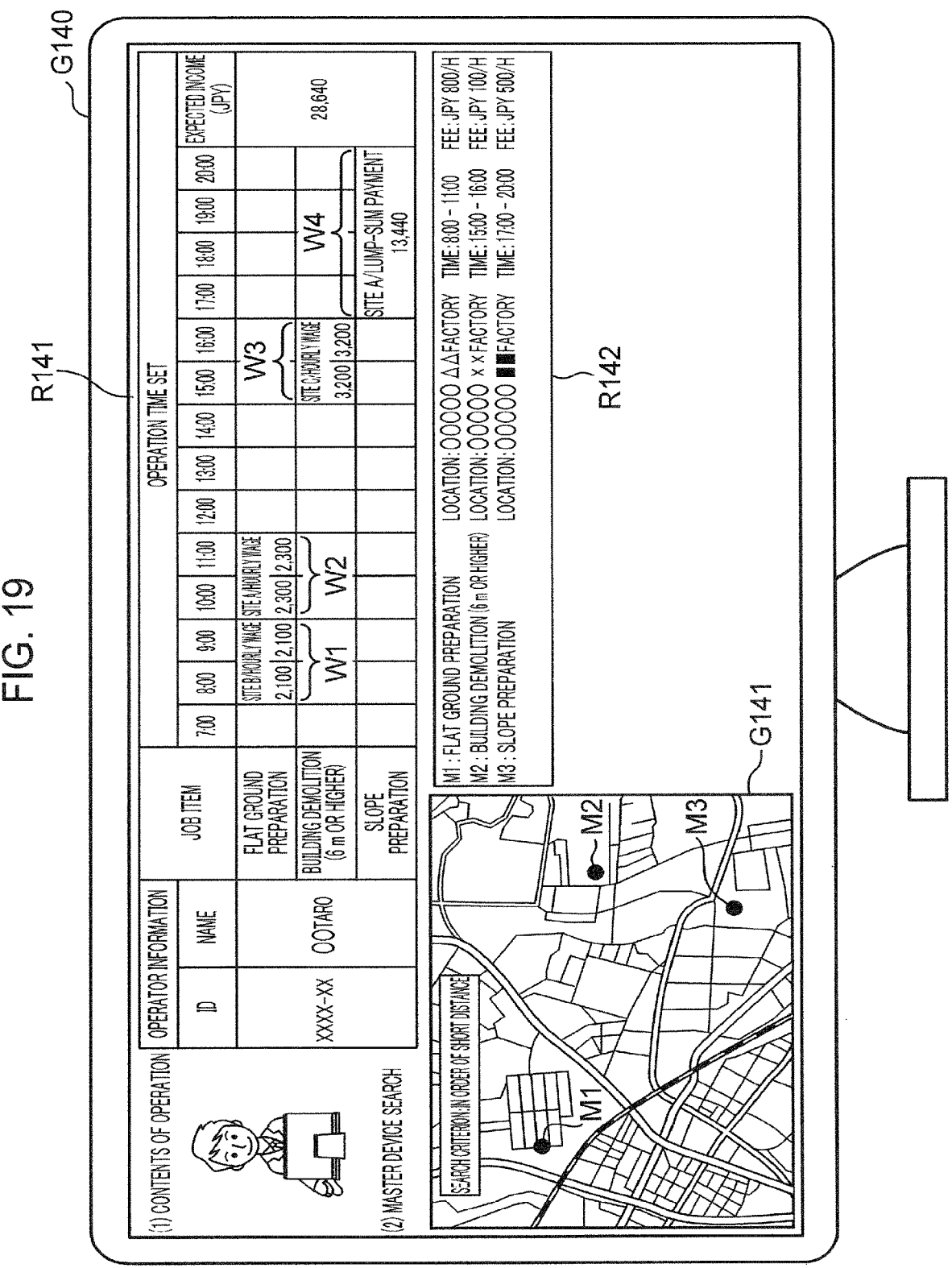

JOB SELECTION SYSTEM AND JOB SELECTION METHOD

TECHNICAL FIELD

The present invention relates to a technology for allowing an operator to select an operation ordered by an orderer to an operator.

BACKGROUND ART

It has recently been more and more difficult for orderers to ensure sufficient operators of construction machines due to a serious shortage of the operators in accordance with their aging. Under the circumstances, expectations for remote manipulation systems have been increasing to permit an operator to remotely manipulate a construction machine without visiting a work site.

Such a remote manipulation system can collect operators from foreign countries in addition to all over the regions in a certain country, and makes it easier for an orderer to ensure sufficient operators. Moreover, the remote manipulation system eliminates the necessity for each operator to visit the work site. With the remote manipulation system, the operator can adopt a work style of changing work sites depending on a desired time segment, e.g., executing an operation on one work site for a desired time segment and another operation on another work site for a subsequent time segment.

Besides, the remote manipulating system allows for free provision of a remote manipulating device for use by an operator who remotely manipulates a construction machine regardless of a site where the operation is actually executed. Therefore, the remote manipulating device can be provided in various facilities including a rental office, a rental conference room, and an internet cafe as well as an office of the orderer who places an operation order or a subcontractor who receives the operation order.

Furthermore, introduction of a new business has been expected to provide a remote manipulating device in a facility such as a rental office and charge a rental fee to an operator who rents the remote manipulating device for a predetermined time to perform a remote manipulation.

There has been a demand for establishment of an operation selection system which permits an operator to easily select a desired operation and a desired remote manipulating device for executing the operation by using an information terminal device, e.g., a smartphone and a tablet. However, there has been no such thing as the demanded operation selection system.

Patent Literature 1 merely discloses a construction quantity management system for calculating productivity of each of work teams for a construction work based on their machine information, operator information, an operation time, and actual construction quantity. Hence, Patent Literature 1 cannot provide the above-described operation selection system.

CITATION LIST

Patent Literature

Patent Literature 1: Japanese Unexamined Patent Publication No. 2002-108975

SUMMARY OF INVENTION

An object of the present invention is to provide a technology for allowing an operator to easily select a desired operation and a desired remote manipulating device for executing the operation by using an information terminal device.

An operation selection system according to one aspect of the present invention is an operation selection system for allowing an operator who remotely manipulates a construction machine by a remote manipulating device to select an operation ordered by an orderer, the operation selection system including: an information terminal device which allows the operator to select the operation; a server communicatively connected with the information terminal device via a network, wherein the server includes: a first database which stores operation request information concerning one or more operations ordered by the orderer in advance; a second database which stores remote manipulating device information including at least an identifier of one or more remote manipulating devices in advance; a display data generation part which generates, based on the operation request information and the remote manipulating device information, display data which causes the information terminal device to display a selection image for allowing the operator to select a desired operation among the one or more operations and a desired manipulation device among the one or more manipulating devices; and a first communication part which transmits the display data to the information terminal device, the information terminal device includes: a second communication part which receives the display data; a display control part which generates the selection image based on the display data and causes a display part to display the generated selection image; an operation part which receives a selection instruction of the operator who selects the desired operation and the desired manipulating device via the selection image, the second communication part transmitting the selection instruction to the server, and the server further includes an order acceptance management part which receives an operation order acceptance of the operator by storing an identifier of the operator, an identifier of the remote operating device designated by the selection instruction, and the operation designated by the selection instruction in combination with one another.

BRIEF DESCRIPTION OF DRAWINGS

FIG. 2A shows an exemplary operation input screen image concerning a construction work to be displayed on an orderer terminal when an orderer places an operation order to an operator.

FIG. 2B is an enlarged view of an exemplary operation schedule input section shown in FIG. 2A.

FIG. 5 shows a configuration of a second database which stores master device information.

FIG. 6B includes enlarged views of image sections G51A, G51B, G51C shown in FIG. 6A.

FIG. 7 shows a configuration of an operation plan database.

FIG. 8 shows a configuration of an operator database.

FIG. 9 shows a configuration of an actual job performance database.

FIG. 10 shows tables each listing machine weight ranges, ATT types, and leading end ATT types.

FIG. 11 shows a configuration of an actual simulator performance database.

FIG. 12 shows a configuration of an actual examination performance database.

FIG. 19 shows an order acceptance result screen image.

DESCRIPTION OF EMBODIMENTS

Hereinafter, an embodiment of the present invention will be described with reference to the accompanying drawings. It should be noted that the following embodiment illustrates one example of the invention, and does not delimit the protection scope of the present invention.

Figure 1:
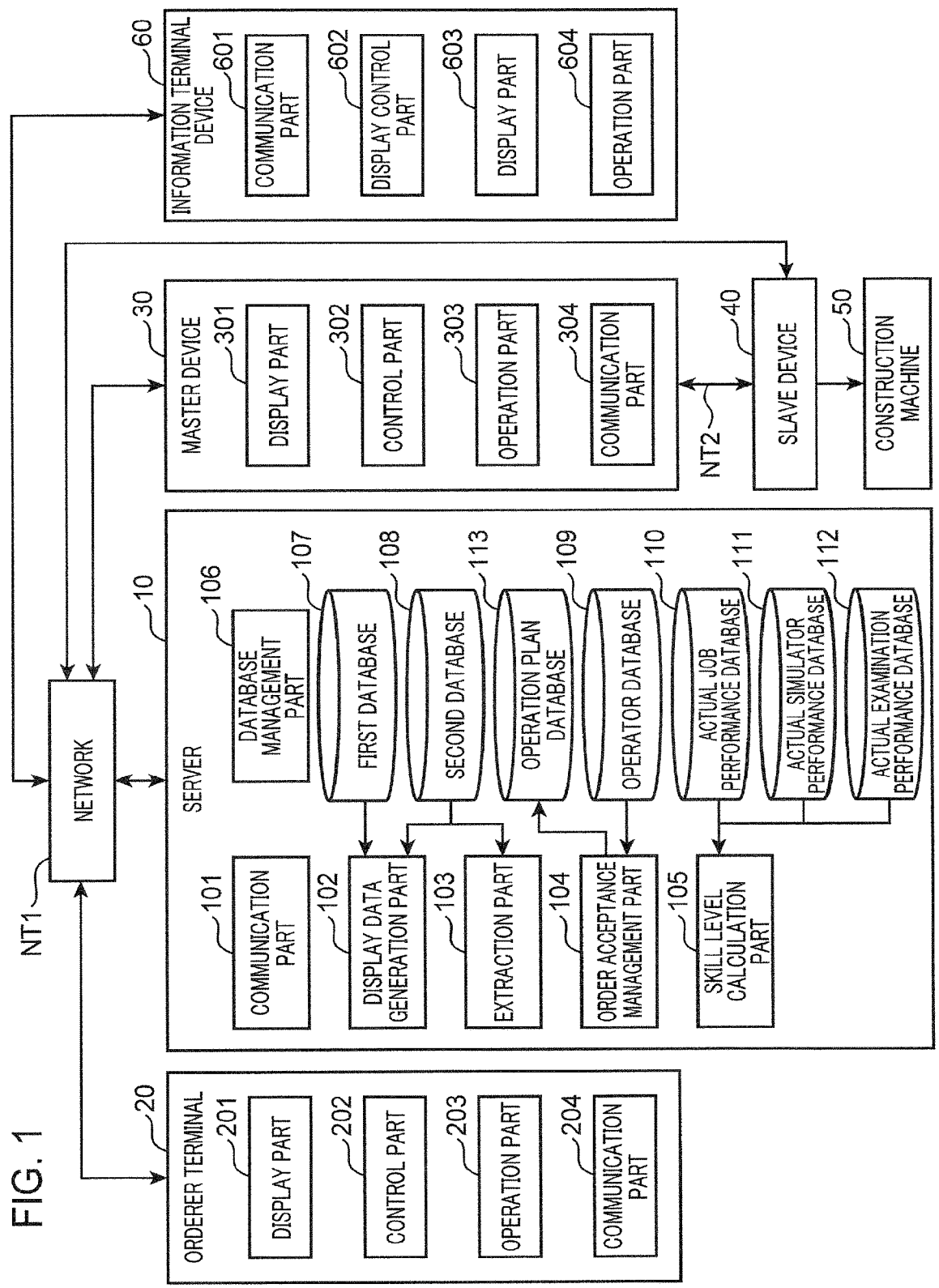
FIG. 1 is a block diagram showing an overall configuration of an operation selection system according to an embodiment of the present invention.

FIG. 1 is a block diagram showing an overall configuration of an operation selection system according to an embodiment of the present invention. The operation selection system includes a server 10, an orderer terminal 20, a master device 30, and an information terminal device 60. The orderer terminal 20 is a device for causing an orderer to place an operation order to an operator who remotely manipulates a construction machine 50 by the master device 30. The server 10 is a device for showing an operation ordered by the orderer on the information terminal device carried by the operator.

The master device 30 is an exemplary remote manipulating device for remotely manipulating the construction machine 50. In the embodiment, the master device 30 is a manipulating device imitating an operating seat device of the construction machine 50, and includes a manipulation lever corresponding to that of the construction machine 50 at the same position as in the construction machine 50. Besides, the master device 30 further includes a seat for allowing the operator to sit thereon, and a display part 301 arranged in front of the seat for displaying a peripheral image of the construction machine 50. The operator remotely manipulates the construction machine 50 by handling the manipulation lever while seeing the peripheral image displayed on the display part 301.

The master device 30 may be provided in, for example, an office of the orderer, an office of a subcontractor who receives the operation order from the orderer, or a facility of a rental agent who permits the operator to temporally rent the master device 30. The facility owned by the rental agent may be, for example, a rental conference room, an internet cafe, an amusement arcade, and a rental office.

A slave device 40 is a subordinate operating device arranged at the operating seat device of the construction machine 50 for directly handling the manipulation lever located at the operating seat device of the construction machine 50 based on a manipulative amount received by the master device 30. The slave device 40 serves as a dummy of the operator manipulating the construction machine 50, and thus manipulates the construction machine 50. The construction machine 50 includes a hydraulic excavator, a hydraulic crane, and the like, and is manipulated by the operator using the master device 30.

For instance, when the operator handles the manipulation lever of the master device 30, a signal representing a manipulative amount corresponding to the handling is transmitted to the slave device 40 via a communication channel NT2. The slave device 40 having received the signal causes the lever of the operating seat device of the construction machine 50 to tilt in accordance with the manipulative amount designated by the signal. The construction machine 50 receives, via the slave device 40, an input of the manipulative amount corresponding to that input by the operator to the lever of the master device 30. Consequently, the construction machine 50 is remotely manipulated.

The information terminal device 60 includes a portable computer such as a smartphone and a tablet carried by the operator. With this configuration, the operator can access the server 10 by using the information terminal device 60 and make a reservation for an operation anytime and anywhere. Adoptable as the information terminal device 60 may be a desk top computer as well as the portable information terminal device.

The server 10, the orderer terminal 20, the master device 30, the slave device 40, and the information terminal device 60 are communicatively connected with one another via a network NT1. The network NT1 can include a long-distance communication network formed of Internet, a mobile phone communication network, or the like.

The master device 30 and the slave device 40 are communicatively connected with each other via the communication channel NT2. The communication channel NT2 includes, for example, a long-distance communication network like the network NT1. However, the communication channel is a mere example. Hence, the communication channel NT2 may be a communication channel, such as a specified low power radio and Bluetooth (registered trademark), which establishes a wireless communication at a distance consisting of several tens to hundreds of meters between the master device 30 and the slave device 40.

The orderer terminal 20 includes a computer such as a personal computer owned by the orderer who places an operation order to the operator. The orderer is a person who makes an operation schedule for a work such as a construction work, and places an operation order to the operator. The orderer is, for example, a worker belonging to a work order placement company. The operator may be, for example, an employee employed by a work order acceptance company, or a freelance operator.

The orderer terminal 20 includes a display part 201, a control part 202, an operation part 203, and a communication part 204. The display part 201 includes, for example, a liquid crystal display. The control part 202 includes, for example, a processor such as a CPU, and controls the entirety of the orderer terminal 20. The operation part 203 includes, for example, a keyboard and a mouse, and receives an input of operation request information from the orderer. The communication part 204 includes a communicator which connects the orderer terminal 20 and the network NT1 with each other, and transmits the operation request information received by the operation part 203 to the server 10 via the network NT1.

FIG. 2A shows an exemplary operation input screen image G1 concerning a construction work to be displayed on the orderer terminal 20 when the orderer places an operation order to the operator. The operation input screen image G1 includes a machine information input section H1, a required skill level input section H2, and an operation schedule input section H3. FIG. 2B is an enlarged view of the operation schedule input section H3.

Referring to FIG. 2A, the machine information input section H1 receives from the orderer an input of information concerning the construction machine 50 to be remotely manipulated for an ordered operation. Specifically, the machine information input section H1 includes columns of "SITE NAME" and "MACHINE INFORMATION". The column "SITE NAME" receives an input of a name of a site where the ordered operation is executed. The column "MACHINE INFORMATION" receives an input of parameters concerning a specification of the construction machine 50 to be remotely manipulated. The column "MACHINE INFORMATION" includes sub-columns of "MACHINE TYPE", "MACHINE MODEL", "ATT", and "LEADING END ATT". The sub-column "MACHINE TYPE" receives an input of a type of the construction machine 50 such as a backhoe, a mini-backhoe, a power excavator, a crane, and the like. FIG. 2A shows an exemplary input of "BACK-HOE". The sub-column "MACHINE MODEL" receives an input of a model number of the construction machine 50, e.g., "SK-200-10". The sub-column "ATT" receives an input of a type of an attachment of the construction machine 50 such as "STANDARD" and "LONG ARMED". For instance, the attachment of the "STANDARD" type includes a boom and an arm. The sub-column "LEADING END ATT" receives an input of a type of a leading end attachment attached to a leading end of the attachment such as "BUCKET" and "NIBBLER".

The required skill level input section H2 receives an input of a required skill level required for the operator by the orderer for each of job items. The operation input screen image G1 concerning the construction work has registration of five job items of "EXCAVATION AND LOADING", "FLAT GROUND PREPARATION", "FLAT GROUND FORMING", "SLOPE PREPARATION", and "SLOPE FORMING" in the required skill level input section H2.

The job item "EXCAVATION AND LOADING" represents excavation of soil, ground, bedrock, and the like, and loading the excavated ones onto a dump truck. The job item "FLAT GROUND PREPARATION" represents preparation of the flat ground formed by way of "FLAT GROUND FORMING". The job item "FLAT GROUND FORMING" represents formation of the flat ground by removing unevenness of the ground. The job item "SLOPE PREPARATION" represents preparation of a slope formed by way of "SLOPE FORMING". The job item "SLOPE FORMING" represents formation of the slope which is artificially made by removing the soil from the ground or adding the soil to the ground. The job items listed in FIG. 2A are mere examples, and thus may include other job items.

The column "REQUIRED SKILL LEVEL" includes sub-columns of "LUMP-SUM PAYMENT" and "HOURLY WAGE". The sub-column "LUMP-SUM PAYMENT" receives an input of a required skill level required by the orderer for the operator who chooses an order acceptance way under "LUMP-SUM PAYMENT". The way under "LUMP-SUM PAYMENT" represents an order acceptance way where the operator accepts the operation order in a lump for an entirety of operation time segments designated by the orderer for each of the job items.

The sub-column "HOURLY WAGE" receives an input of a required skill level required by the orderer for the operator who chooses another order acceptance way under "HOURLY WAGE". The way under "HOURLY WAGE" represents another order acceptance way where the operator partially accepts the operation order for a part of the operation time segments designated by the orderer for each of the job items. Hereinafter, the former order acceptance way where the operator accepts the operation order in a lump for the entirety of the operation time segments is referred to as a "lump order acceptance", and the latter order acceptance way where the operator partially accepts the operation order for a part of the operation time segments is referred to as a "partial order acceptance".

In the embodiment, a skill level of an operator is determined in accordance with five ranks of skill levels in descending order of S, A, B, C, and D as shown in a rank determination table T3. The orderer sequentially inputs a required skill level in accordance with the ranks determined in FIG. 3.

Figure 3:
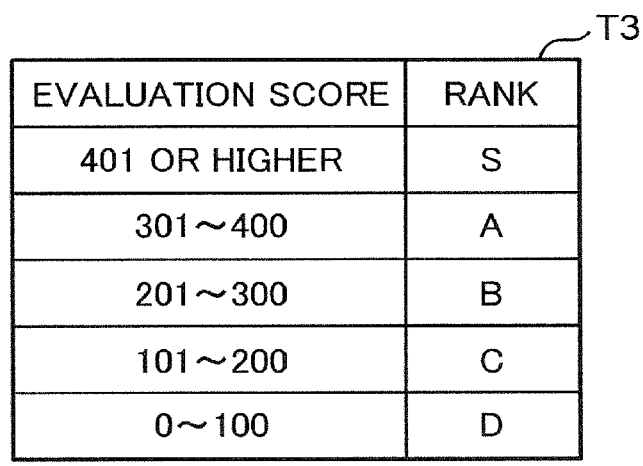
FIG. 3 shows an exemplary rank determination table.

FIG. 3 shows the exemplary rank determination table T3. The rank determination table T3 is stored in a memory included in the server 10 in advance, and includes columns of "EVALUATION SCORE" and "RANK". In the example in FIG. 3, the five ranks of skill levels are determined in descending order of S, A, B, C, and D. Therefore, the rank determination table T3 has registration of ranks S to D in this order in the column "RANK", and an evaluation score range for each of the ranks S to D is recorded in the column "EVALUATION SCORE". The evaluation score is used by a skill level calculation part 105 to be described later for determining the skill level of the operator with reference to an actual job performance and the like of the operator.

The exemplary required skill level input section H2 shown in FIG. 2A receives an input of the required skill level ranked "C" for the lump-sum payment and an input of the required skill level ranked "D" for the hourly wage for "EXCAVATION AND LOADING". It is seen from this perspective that the required skill level under the lump order acceptance is generally higher than that under the partial order acceptance. This is because it would be more difficult to collect a large number of operators at a higher required skill level under the partial order acceptance, resulting in an increased possibility that an operation time set in combination with the corresponding operation would have one or more operation time segments for which the operation order has been unaccepted.

However, the aforementioned ranking way is a mere example. Both the lump order acceptance and the partial order acceptance may be ranked at the same required skill level, like the rank "S" input for both the lump order reception and the partial order reception for "SLOPE FORMING" as shown in FIG. 2A. Alternatively, the partial order acceptance may be ranked at a higher required skill level than that of the lump order acceptance. In this manner, the orderer may preferably decide the required skill level under each of the lump order acceptance and the partial order acceptance.

Referring to FIG. 2B, the operation schedule input section H3 receives from the orderer an input of an operation time set for each of the job items. The operation schedule input section H3 includes columns of "SITE NAME", "MACHINE INFORMATION", "JOB ITEM", "REQUIRED SKILL LEVEL", "REMUNERATION", and "OPERATION TIME SET" with the title "APRIL 3, 2021". The columns "SITE NAME" and "MACHINE INFORMATION" reflect the information input in the machine information input section H1. The column "JOB ITEM" reflects the job items listed in the required skill level input section H2. The column "REQUIRED SKILL LEVEL" reflects the required skill levels input in the sub-columns "LUMP-SUM PAYMENT" and "HOURLY WAGE" for each of the job items listed in the required skill level input section H2. The column "REMUNERATION" receives an input of a remuneration for each of the job items to be given for the operator by the orderer. In the embodiment, the orderer can input a remuneration in the column "REMUNERATION" for each of the "LUMP-SUM PAYMENT" and "HOURLY WAGE", independently.

Figure 4:
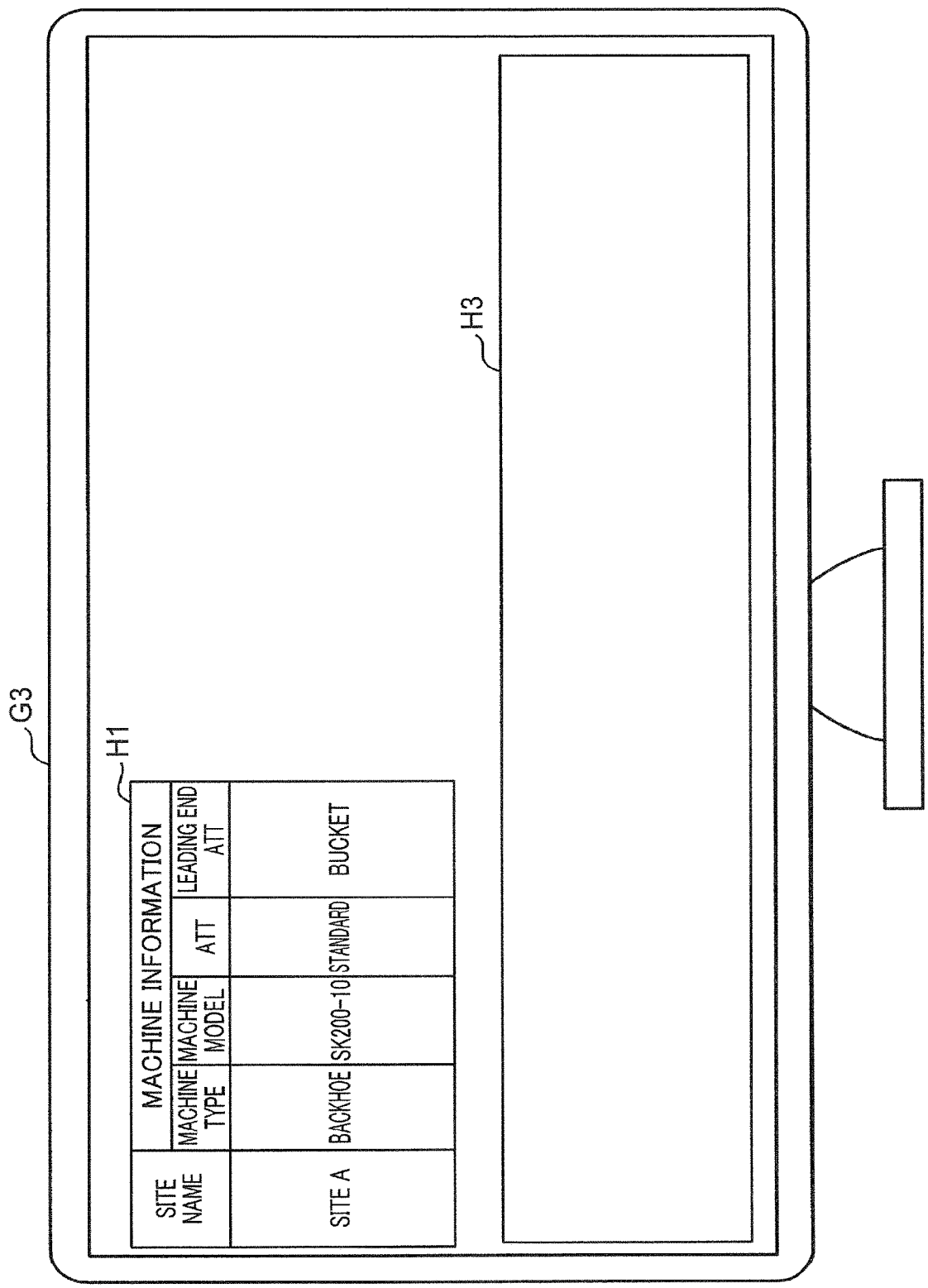
FIG. 4A shows an exemplary final screen image to be displayed on the orderer terminal when the orderer finishes an input of contents of an operation.
FIG. 4B is an enlarged view of an operation schedule input section shown in FIG. 4A.

Referring to the example shown in FIG. 4B, the remuneration "JPY 14,400" is input for "LUMP-SUM PAYMENT", and the remuneration "JPY 2,000" is input for "HOURLY WAGE" in connection with "EXCAVATION AND LOADING". Here, a conversion of the remuneration under "LUMP-SUM PAYMENT" into that on an hourly basis in accordance with the operation time set of "six time segments" for "EXCAVATION AND LOADING" results in "JPY 2,400" that is higher than the remuneration under "HOURLY WAGE". Such a lump order acceptance of the operation for the entirety of operation time segments by the operator alone is convenient for the orderer in terms of reduction in the burden of operation schedule management. Therefore, in the example in FIG. 4B, the remuneration for the lump order acceptance is higher than the remuneration for the partial order acceptance to motivate the operator to choose the lump order acceptance.

Referring back to FIG. 2B, the column "OPERATION TIME SET" receives an input of an operation time set on a day for each of the job items in connection with a site whose name (here, "SITE A") is input in the column "SITE NAME". In this case, the column "OPERATION TIME SET" is displayed with the title "Apr. 3, 2021" for receiving an input in an operation time segment on Apr. 3, 2021. In a case where a schedule for the work on the site A consists of a plurality of days, a switch button may be provided on the operation input screen image G1 for displaying another column "OPERATION TIME SET" on another day.

The column "OPERATION TIME SET" is formed of a two-dimensional table defined by horizontally extending time axes and vertically extending job item axes. Specifically, the column "OPERATION TIME SET" is partitioned in a grid shape by a plurality of vertical lines dividing 24 hours into hourly-basis time segments, and a plurality of horizontal lines dividing the operation into the job items. The column "OPERATION TIME SET" consists of 24 hours×5 rows=120 cells.

The orderer sequentially selects a desired operation time segment by a selection of a cell corresponding to the operation time segment of the operation time set through an input action (e.g., clicking and dragging). For example, the orderer performs the input action of selecting four cells from 9:00 to 12:00 in the first row for a selection of the operation time segments from 9:00 to 12:00 for "EXCAVATION AND LOADING". For display of the selected cells, a first color (e.g., white) indicating a default is changed to a second color different from the first color to clarify the selection. The orderer therefore can easily confirm the selected operation time segments. The column "OPERATION TIME SET" in this configuration includes operation time segments selectable on an hourly basis. However, this is a mere example, and the operation time set may include operation time segments selectable on a desired time basis, e.g., on the basis of 30 minutes, 10 minutes, two hours, three hours, or the like.

In a case where the construction machine 50 is remotely manipulated to proceed with the work, the orderer can collect operators from all over the world. Hence, it is possible to continuously proceed with the relevant operation for 24 hours by, for example, causing one operator in a certain country to remotely manipulate the construction machine 50 during daytime, and another operator in a foreign country to remotely manipulate the construction machine 50 during nighttime. For this purpose, each of the time axes in the column "OPERATION TIME SET" defines 24-hour time segments from 1:00 to 24:00 thereon.

FIG. 4A shows an exemplary final screen image G3 to be displayed on the orderer terminal 20 when the orderer finishes inputting the job items. FIG. 4B is an enlarged view of the operation schedule input section H3 shown in FIG. 4A. For instance, the final screen image G3 is displayed after the orderer finishes inputting all the information necessary for placing the operation order to the operation input screen images G1, G2, and clicks an unillustrated confirmation button. In response to the clicking of the confirmation button, the orderer terminal 20 sends the respective input information to the server 10 as the operation request information.

The final screen image G3 is the same as the operation input screen images G1, G2 except no display of the required skill level input section H2.

It is seen from the example in FIG. 4B that the cells from 1:00 to 6:00 are displayed in the second color for "EXCAVATION AND LOADING", and thus the operation time set designated therefor is 1:00 to 6:00. Besides, the cells from 7:00 to 12:00 are displayed in the second color for "FLAT GROUND PREPARATION", and thus the operation time set designated therefor is 7:00 to 12:00. In the same manner, an operation time set is designated in combination with each of the remaining job items. A different color may be used in place of the second color for each of the job items.

It is further clear from the columns "REQUIRED SKILL LEVEL" and "REMUNERATION" that the remuneration is higher as the required skill level is higher. This configuration can motivate the operator to improve the operator's skill level since such improvement in the skill level leads to an order acceptance of a job with a higher remuneration.

Referring back to FIG. 1, the server 10 is constituted by a computer including: a processor such as a CPU; a memory; and a communication function, and includes a communication part 101, a display data generation part 102, an extraction part 103, an order acceptance management part 104, the skill level calculation part 105, and a database management part 106. The server 10 further includes a first database 107, a second database 108, an operator database 109, an actual job performance database 110, an actual simulator performance database 111, an actual examination performance database 112, and an operation plan database 113. The various databases shown in FIG. 1 are stored in the memory of the server 10. Moreover, in FIG. 1, each of the display data generation part 102 to the database management part 106 comes into effect, for example, when the CPU executes a corresponding program.

The communication part 101 (which is an exemplary "first communication part") includes, for example, a communicator which connects the server 10 and network NT1 with each other, and receives the operation request information sent from the orderer terminal 20.

The display data generation part 102 generates, based on the operation request information stored in the first database 107 and master device information (which is exemplary "remote manipulating device information") stored in the second database 108, display data which causes the information terminal device 60 to display a selection image for allowing the operator to select a desired operation among one or more operations and a desired master device 30 among one or more master devices 30.

The operation request information includes information concerning the one or more operations ordered by the orderer, specifically, includes information input by the orderer via the operation input screen image G1 shown in each of FIGS. 2A and 2B. It is seen from the examples shown in FIGS. 2A and 2B that the operation request information includes information concerning "SITE NAME" of a site where an operation is executed, "MACHINE INFORMATION" of a machine to be used for the operation, "JOB ITEM" designating a job which has been ordered, "REQUIRED SKILL LEVEL" required for the job, "REMUNERATION" for the job, and "OPERATION TIME SET" requested by the orderer for the job. Here, one operation ordered by the orderer includes "SITE NAME" of a site where the operation is executed as shown in FIG. 4A, and one of the job items listed in the column "JOB ITEM" and an "OPERATION TIME SET" for the job item respectively shown in the operation schedule input section H3 in FIG. 4B.

FIG. 5 shows a configuration of the second database 108 which stores the master device information. The second database 108 where one record is associated with a piece of master device information includes columns of "MASTER DEVICE ID", "MASTER DEVICE NAME", "LOCATION", and "RENTAL FEE".

The column "MASTER DEVICE ID" represents an identifier for uniquely identifying each of the master devices 30. The column "MASTER DEVICE NAME" represents a name of each of the master devices 30. The column "LOCATION" represents a location of each of the master devices 30. The location may be specified by adopting, for example, the address of the location, or the longitude and the latitude of the location. The column "RENTAL FEE" represents a fee to be charged by a master device manager to the operator when the operator uses the master device 30.

An agent or entity is expected to expand a business of providing one or more master devices 30 in a facility such as a rental office and an internet cafe for allowing an operator to rent a desired master device 30, and charge a rental fee to the operator in exchange for the rent. The column "RENTAL FEE" is thus referred to by the operator when the operator uses the master device 30 owned by the agent or entity. Here, the rental fee is not necessarily charged to the operator. For instance, the operator may be a worker of a subcontractor owning the master device 30, and thus can use the master device 30 without no charge of the rental fee. In this case, "JPY 0" is stored in the column "RENTAL FEE".

The fee in the column "RENTAL FEE" may be differently set depending on time segments. For instance, the fee in the column "RENTAL FEE" may be set at a higher value in nighttime segments (e.g., from 17:00 to 22:00) than in daytime segments (e.g., 8:00 to 17:00), and may be set at a further higher value in much later nighttime segments (e.g., 22:00 to 8:00). This setting can motivate the operator to choose working during the nighttime and a much later time at night. Moreover, this configuration enables recruitment of foreign operators each aiming at working by using a time-difference.

The master device information may be input via the master device 30, or may be input by a master device manager who manages the master device 30 via his or her information terminal device.

Figure 6A:
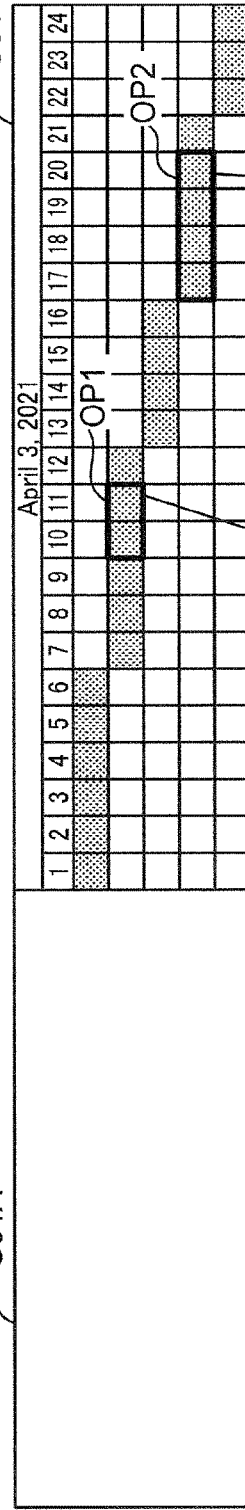
FIG. 6A shows an exemplary display image displayed on an information terminal device for a selection of an operation order acceptance of an operator.

In the embodiment, the selection image includes an operation selection image for allowing the operator to select a desired job item, and a master device selection screen image for allowing the operator to select a desired master device 30. The display data generation part 102 generates, based on the operation request information stored in the first database 107, first display data which causes the information terminal device 60 to display the operation selection image. As shown in FIGS. 6A and 6B, an operation selection image G5I shows job items and operation time segments in combination with each other in such a way as to allow a selection of a desired one of the operation time segments. The generated first display data is displayed on the information terminal device 60 via the communication part 101.

Furthermore, the display data generation part 102 generates a master device selection screen image based on the master device information stored in the second database 108. The details of the master device selection screen image will be described later.

FIG. 6A shows an exemplary display image G5 displayed on the information terminal device 60 for a selection of an operation order acceptance of an operator. FIG. 6B includes enlarged views of image sections G51A, G51B, G51C. The display image G5 includes an operation selection image G51 and an operation schedule image G52. Here, three orderers place their respective operation orders for corresponding operations on sites A, B, and C, and hence three operation selection images G51 therefor are displayed. The three orderers send their operation request information independently by using their respective orderer terminals 20.

Like the operation schedule input section H3 described with reference to FIG. 2B, each of the operation selection images G51 includes columns of "SITE NAME", "MACHINE INFORMATION", "JOB ITEM", "REQUIRED SKILL LEVEL", "REMUNERATION", and "OPERATION TIME SET" with the title "APRIL 3, 2021". These columns directly reflect the information input by the orderer to the operation input screen image G1, and thus details of description therefor are omitted. Regarding the site A, the orderer designates an operation time set for each of the five job items of "EXCAVATION AND LOADING" to "SLOPE FORMING". Hence, corresponding operation time sets for the five jobs are displayed. Regarding the site B, the orderer designates no operation time set for each of "SLOPE PREPARATION" and "SLOPE FORMING". Accordingly, these two job items are excluded without being displayed.

Regarding the site C, the orderer places an operation order concerning a demolition work, and performs an input of two job items "BUILDING DEMOLITION (6 m OR MORE)" and "RUBBLE LOADING". Therefore, corresponding operation time sets for the two job items are displayed.

The operation schedule image G52 shows one or more desired operation time segments selected by an operator O1 from a specific operation time set shown in the relevant operation selection image G51 and each of the job items in combination with each other. Specifically, the operation schedule image G52 includes columns of "OPERATOR INFORMATION", "JOB ITEM", and "SELECTED TIME SET". The column "OPERATOR INFORMATION" shows an operator ID and a name of the operator O1. The column "JOB ITEM" shows each of the job items in combination with one or more desired time segments selected by the operator O1. However, the column "JOB ITEM" excludes a job item for which no time segment is selected by the operator O1. In this configuration, desired time segments are selected for the three job items of "FLAT GROUND PREPARATION", "BUILDING DEMOLITION (6 m OR HIGHER)", and "SLOPE PREPARATION", and thus these three job items are displayed.

The column "SELECTED TIME SET" is formed of a two-dimensional table defined by horizontally extending time axes and vertically extending job item axes. The column "SELECTED TIME SET" is partitioned in a grid shape by a plurality of vertical lines dividing each of the time axes into hourly-basis segments and a plurality of horizontal lines dividing the operation into the job items. Each of the time axes defining 7:00 to 20:00 in the embodiment is just an example, and thus may define 1:00 to 24:00 instead.

In the examples in FIGS. 6A and 6B, the operator O1 uses an operation part 604 to perform an operative action OP1 of an input designating a partial order acceptance for two time segments from 10:00 to 11:00 that are a part of the operation time set of six time segments from 7:00 to 12:00 for "FLAT GROUND PREPARATION" on the site A. In response, a display control part 602 included in the information terminal device 60 changes the first color to the second color for display of two cells corresponding to the two time segments from 10:00 to 11:00 for "FLAT GROUND PREPARATION" in the operation schedule image G52. Furthermore, the display control part 602 displays "SITE A" in each of the two cells to indicate the selection of the two time segments for the site A. Additionally, the display control part 602 displays "2300" in each of the two cells to show the hourly wage of JPY 2,300 for the time segments.

The operator O1 further uses the operation part 604 to perform an operative action OP2 of an input designating a lump order acceptance for an entirety of the operation time set of four time segments from 17:00 to 20:00 for "SLOPE PREPARATION" on the site A. In response, the display control part 602 of the information terminal device 60 merges four cells corresponding to the four time segments from 17:00 to 20:00 for "SLOPE PREPARATION" into a single cell, and changes the first color to the second color for display of the merged cell in the operation schedule image G52. Furthermore, the display control part 602 displays "SITE A" in the merged cell to indicate the selection of the time segments for the site A. Additionally, the display control part 602 displays "13,440" in the merged single cell under the remuneration of JPY 13,440 for the corresponding time segments.

In response to other operative actions OP3 and OP4, corresponding one or more selected operation time segments are shown in the operation schedule image G52 in the same manner as the operative actions OP1, OP2.

The column "SELECTED TIME SET" includes a sub-column of "EXPECTED INCOME" for notifying the operator O1 of the sum of the remunerations. The sum of the remunerations for all the operation time segments selected through the operative actions OP1 to OP 4 is JPY 28,640, and thus the sub-column "EXPECTED INCOME" shows "28,640".

As described heretofore, in response to a selection of a desired operation time segment in the operation selection image G51, the operation schedule image G52 reflects the selected operation time segment. Hence, the operator O1 can make an operation schedule at the operator's convenience while sequentially performing an input action of selecting a desired operation time segment of an operation time set for each of the job items to the operation selection image G51. Furthermore, both the operation selection image G51 and the operation schedule image G52 are displayed in juxtaposition on the display image G5. Thus, the operator O1 can easily confirm the selected operation time segments. Moreover, the operator O1 can make an operation schedule to achieve a target sum amount of income while checking each sum amount shown in the column "EXPECTED INCOME".

The operation selection image G51 shows the remunerations under the lump-sum payment and the hourly wage individually, and hence can provide the operator O1 with information for a decision to choose the lump order acceptance or the partial order acceptance.

The operation selection image G51 further shows the required skill levels for the lump-sum payment and the hourly wage individually, and hence can provide the operator O1 with another information for a decision to confirm whether the operator's skill level satisfactorily meets the job item.

The operator O1 clicks an unillustrated submit button after finishing the input to the operation schedule image G52. In response to the clicking, a communication part 304 included in the master device 30 transmits a first selection instruction designating the operation selected by the operator via the operation schedule image G52 to the server 10. For instance, the first selection instruction contains information indicating the operation selected by the operator O1 and an operator ID. The information indicating the operation further contains a site name, a job item, and an operation time set of the operation selected by the operator.

Referring back to FIG. 1, when the communication part 101 receives a search criterion for searching a master device 30 input by the operator, the extraction part 103 extracts one or more master devices 30 which meet the search criterion.

The search criterion may include a criterion of searching a master device 30 in order of a short distance thereto from a position of the information terminal device 60 or a position designated by the operator. In this case, the extraction part 103 may sufficiently extract from the second database 108 a predetermined number of master devices 30 in order of a short distance thereto from a current position of the information terminal device 60 or a position designated by the operator. The current location of the information terminal device 60 is specified by, for example, using location information sent from an unillustrated GPS sensor included in the information terminal device 60.

Further, the search criterion may include a criterion of searching a master device 30 in order of a rental fee (which is an exemplary "usage fee"), beginning with the lowest or the highest therefor. In this case, the extraction part 103 may extract from the second database 108 a predetermined number of master devices 30 in order of the rental fee, beginning with the lowest or the highest.

Additionally, the search criterion may include a criterion of designating a reservation date and a reservation time for a master device 30. In this case, the extraction part 103 extracts from the operation plan database 113 master devices 30 available at the reservation time on the reservation date designated from the operation plan database 113 as the search criterion.

In response to the extraction of the relevant master devices 30 by the extraction part 103, the display data generation part 102 generates second display data which causes the information terminal device 60 to display a master device selection screen image for allowing the operator to select a desired master device 30 among the extracted master devices 30, and uses the communication part 101 to transmit the generated second display data to the information terminal device 60.

When the communication part 101 receives the first selection instruction designating the operation selected by the operator via the operation selection image G51 and a second selection instruction containing the master device ID of the master device 30 selected by the operator via the master device selection screen image, the order acceptance management part 104 receives an order acceptance of the operator by storing, in the operation plan database 113, an operator ID contained in the first selection instruction and the second selection instruction, information indicating the operation designated by the first selection instruction, and the master device ID contained in the second selection instruction in combination with one another.

FIG. 7 shows a configuration of the operation plan database 113. The operation plan database 113 stores the operator ID, information of operations W1 to W4 selected by the operator via the operation selection image G51 shown in FIGS. 6A and 6B, and the master device ID of the master device 30 selected by the operator for each of the operations W1 to W4 in combination with one another. It is seen from the example shown in FIG. 7 that the operator "ooo TARO" selects the operation W1 for "FLAT GROUND PREPARATION" on the site B for two operation time segments from 8:00 to 9:00, and selects the master device 30 having the master device ID "M001" for the operation W1. Therefore, the order acceptance management part 104 stores, in the operation plan database 113, the operator ID of the operator "ooo TARO", the information of the operation W1, and the master device ID "M001" in combination with one another. For each of the remaining operations W2 to W4 shown in FIG. 7, the order acceptance management part 104 stores, in the operation plan database 113, a corresponding operator ID, information indicating each of the operations, and a corresponding master device ID in combination with one another in the same manner as the operation W1.

The order acceptance management part 104 may receive an operation order acceptance of the operator after executing an order acceptance determination process to be described below when the communication part 101 receives the first selection instruction. Specifically, the order acceptance management part 104 acquires from the operator database 109 a skill level of the operator when the communication part 101 receives the first selection instruction. The order acceptance management part 104 then accepts the order acceptance of the operator for a desired operation time segment designated by the first selection instruction in a case where the operator having the acquired skill satisfies the condition of skill level equal to or higher than the corresponding required skill level under the partial order acceptance. Similarly, the order acceptance management part 104 accepts the order acceptance of the operator for the desired time segment designated by the first selection instruction in a case where the operator having the acquired skill satisfies the condition of skill level equal to or higher than the corresponding required skill level under the lump order acceptance.

Referring to FIG. 4B, for example, the order acceptance management part 104 refuses to accept a lump order acceptance of an operator having the skill level ranked "D" for "EXCAVATION AND LOADING" on the site A since the required skill level for "EXCAVATION AND LOADING" under the lump order acceptance is ranked "C". Conversely, the order acceptance management part 104 accepts a partial order acceptance of this operator for "EXCAVATION AND LOADING" on the site A since the required skill level for "EXCAVATION AND LOADING" under the partial acceptance is ranked "D".

The order acceptance management part 104 having finished the order acceptance determination process may use the communication part 101 to transmit an acceptance or refusal result of the order acceptance to the information terminal device 60. In this case, the information terminal device 60 may, for example, rechange the second color to the first color for display of the cell corresponding to the operation time segment for which the order acceptance is refused, and then display a message notifying the refusal near the operation schedule image G52. Conversely, in a case where the order acceptance for all the operation time segments is accepted, the information terminal device 60 may display a message notifying the acceptance of the order acceptance for all the operation time segments near the operation schedule image G52.

FIG. 8 shows a configuration of the operator database 109. The operator database 109 includes an operator table T1 and a skill level table T2. The operator table T1 has registration of individual information of operators entered in advance. The skill level table T2 exists for each of the entered operators.

Specifically, the operator table T1 includes columns of "OPERATOR ID", "NAME", "COUNTRY", "EMAIL ADDRESS", and "PASSWORD". The column "OPERATOR ID" represents an identifier for uniquely identifying each of the entered operators. The column "NAME" represents the name of the operator. The column "COUNTRY" represents a country, such as Japan and Germany, where the operator lives. The column "EMAIL ADDRESS" represents an email address of the information terminal device 60 carried by the operator. The column "PASSWORD" represents a password required when the operator logs in the operation selection system.

The skill level table T2 includes columns of "MACHINE WEIGHT RANGE", "ATT TYPE", "LEADING END ATT TYPE", and "SKILL LEVEL". This table has registration of "SKILL LEVEL" of the operator in correspondence to a group of "MACHINE WEIGHT RANGE", "ATT TYPE", and "LEADING END ATT TYPE". Specifically, the skill level table T2 has registration of skill levels in correspondence to a plurality of groups each consisting of different parameters of a plurality of parameters concerning a specification of the construction machine 50. The column "MACHINE WEIGHT RANGE" represents a predetermined weight range of the construction machine 50, such as the range from 3 t to 5 t, the range from 6 t to 13 t and the like. The column "ATT TYPE" represents a predetermined attachment type, and the column "LEADING END ATT TYPE" represents a predetermined leading end attachment type.

The operator specified in the skill level table T2 in FIG. 8 has the skill level ranked "S" for the machine weight range of "3 t-5 t", the ATT type of "STANDARD", and the leading end ATT type of "BUCKET". Accordingly, the column "SKILL LEVEL" has registration of the rank "S" in the first record row.

In advance, each of the skill levels shown in FIG. 8 is calculated by the skill level calculation part 105 to be described later based on a past actual job performance and the like of the operator, and registered in the skill level table T2.

Referring back to FIG. 1, the order acceptance management part 104 having accepted the order acceptance for the desired time segment designated by the first selection instruction issues an access code for permitting the operator to execute the operation for the desired time segment under the order acceptance. The communication part 101 transmits the access code to each of the master device 30 and the slave device 40.

Each of the master device 30 and the slave device 40 having received the access code stores the access code in their respective memories (not shown). The operator is required to input the access code to execute the operation under the order acceptance by way of a remote manipulation using the master device 30. The master device 30 collates the access code input by the operator with the access code stored in the memory, and sends the input access code to the slave device 40 after confirming that the access codes match each other. The slave device 40 collates the received access code with the access code stored in the memory, and transmits an access permission notification to the master device 30 after confirming that the access codes match each other. Accordingly, the operator can remotely manipulate the construction machine 50 by the master device 30.

The access code may include an amount of characteristic about a face image of the operator. In this case, the master device 30 acquires the face image of the operator by using an unillustrated camera, extracts the amount of characteristic about the face image, and sends the amount of characteristic to the slave device 40 after confirming that the sent amount of characteristic matches the amount of characteristic stored in the memory. The slave device 40 sends the access permission notification to the master device 30 after confirming that the sent amount of characteristic matches the amount of characteristic stored in the memory. If the access code consists of a character string, other person may steel the character string and input the stolen character string to thereby perform the remote manipulation using the master device 30. In contrast, use of the access code based on the amount of characteristic about the face image can prevent such an unauthorized remote manipulation by other person.

Besides, the access code may be provided with a predetermined expiration term. The expiration term may include a finish date and time of the corresponding time segment. The setting of the expiration term can avoid an incident that the operator would remotely manipulate the construction machine 50 for the operation which has already been finished.

The skill level calculation part 105 calculates the skill level of each of the entered operators by calculating a sum total value of evaluation scores of the respective job items with reference to the actual job performance database 110, the actual simulator performance database 111, and the actual examination performance database 112, and collating the calculated sum total value of the evaluation scores with the rank determination table T3, and registers the calculated skill level in the operator database 109.

Hereinafter, the calculation of the skill level will be described in detail. FIG. 9 shows a configuration of the actual job performance database 110. The actual job performance database 110 exists for each of the entered operators concerning each of groups of "MACHINE WEIGHT RANGE", "ATT TYPE", and "LEADING END AFT TYPE", and has registration of a corresponding past actual job performance therefor. In the example in FIG. 9, the actual job performance database 110 relates to a group of "MACHINE WEIGHT RANGE" of "3 t-5 t", "ATT TYPE" of "STANDARD", and "LEADING END ATT TYPE" of "BUCKET". If the relevant operator has another actual job performance concerning a different group other than the group of "MACHINE WEIGHT RANGE" of "3 t-5 t", "ATT TYPE" of "STANDARD", and "LEADING END ATT TYPE" of "BUCKET", a corresponding actual job performance database 110 in connection with the different group exists as well. Here, "ACTUAL JOB PERFORMANCE" represents an actual performance of the operator for each of jobs ordered by the orderer and actually executed by the operator who remotely manipulates the construction machine 50 on an actual work site.

FIG. 10 shows tables each listing the machine weight ranges, the ATT types, and the leading end ATT types. As shown in table 141, the weight ranges in the embodiment are include five ranges of "3 t-5 t", and "6 t-13 t" to "50 t or HEAVIER". As shown in table 142, the ATT types in the embodiment includes five types of "STANDARD", "LONG-RANGED", "SEPARATED," "THREE-FOLDED", and "SHORT-ARMED". As shown in table 143 in the embodiment, the leading end ATT types include five types of "BUCKET", "ROTATABLE GRAPPLE", "MECHANICAL GRAPPLE", "SMALL NIBBLER", and "LARGE NIBBLER".

For instance, in a case where a specific operator has an actual job performance for a group of the machine weight range of "3 t-5 t", the ATT type of "STANDARD", and the leading end ATT type of "BUCKET", and another actual job performance for another group of the machine weight range of "3 t-5 t", the ATT type of "LONG-RANGED", and the leading end ATT type of "BUCKET", two actual job performance databases 110 exist in connection with the two groups.

Referring back to FIG. 9, the actual job performance database 110 includes columns of "JOB ITEM", "BASE POINT", "JOB TIME PERIOD", and "EVALUATION SCORE". The column "JOB ITEM" has registration of job items, specifically, five job items of "EXCAVATION AND LOADING", "FLAT GROUND PREPARATION", "FLAT GROUND FORMING", "SLOPE PREPARATION", and "SLOPE FORMING". The column "JOB TIME PERIOD" has registration of a cumulative job time period for each of the job items concerning the corresponding jobs actually executed by the operator.

The "BASE POINT" represents a predetermined coefficient to be multiplied by the job time period input to the column "JOB TIME PERIOD". Here, the value of the base point is determined so that the base point is higher for the job with higher difficulty. The "EVALUATION SCORE" represents a numeric value of a product of the base point and the job time period for each of the job items. A job with a higher score means that the job is more difficult. Accordingly, the required skill level required for the operator is increased as well.

Regarding the actual job performance database 110, the skill level calculation part 105 calculates the evaluation score by multiplying the job time period by the base point, and registers the calculated evaluation score in the column "EVALUATION SCORE" for each of the job items. FIG. 10 shows registration of five job items of "EXCAVATION AND LOADING" to "SLOPE FORMING" concerning the construction work. This is because the operator has the actual job performance for each of the job items. For instance, if the operator has an actual job performance concerning the demolition work, relevant job items concerning the demolition work are also registered. As described above, the actual job performance database 110 has registration of the job items reflecting the actual job performance and the cumulative values of the actual job time periods in combination with each other.

FIG. 11 shows a configuration of the actual simulator performance database 111. The actual simulator performance database 111 exists for each of the entered operators, and has registration of an actual performance of the operator having performed a training for the remote manipulation using a simulator included in the master device 30. The actual simulator performance database 111 includes columns of "JOB ITEM", "BASE POINT", "JOB TIME PERIOD", and "EVALUATION SCORE". The column "JOB ITEM" has registration of the job items for which the operator has performed the training by using the simulator. The column "JOB TIME PERIOD" has registration of cumulative values of a training time period of the operator having performed the training by using the simulator for each of the job items. The columns "BASE POINT" and "EVALUATION SCORE" are the same as those described with reference to FIG. 10.

Regarding the actual simulator performance database 111, the skill level calculation part 105 calculates the evaluation score by multiplying the job time period by the base point, and registers the calculated score in the column "EVALUATION SCORE" for each of the job items. FIG. 11 shows registration of five job items of "EXCAVATION AND LOADING" to "SLOPE FORMING" concerning the construction work. This is because the operator has the actual training performance for each of the job items. As described above, the actual simulator performance database 111 has registration of the job item reflecting the actual training performance, and the cumulative values of the actual training time period for the job item, and the evaluation score for the job item in combination with one another.

FIG. 12 shows a configuration of the actual examination performance database 112. The actual examination performance database 112 exists for each of the entered operators, and has registration of a judgment result of a predetermined examination executed for each of the job items. The examination is executed to ensure that the operator has a predetermined skill level or higher for a specific job item.

The actual examination performance database 112 includes columns of "EXAMINATION ITEM", "BASE POINT", "JUDGMENT RESULT", and "EVALUATION SCORE". The column "EXAMINATION ITEM" has registration of job items for which corresponding examinations are executed. Here, an examination is executed for each of the three job items of "EXCAVATION AND LOADING", "FLAT GROUND PREPARATION", and "SLOPE FORMING", and hence the column "EXAMINATION ITEM" has registration of the three job items. The column "JUDGMENT RESULT" has registration of a judgment result of the examination. Passing is denoted by the numeral "1", and not-passing is denoted by the numeral "0". The columns "BASE POINT" and "EVALUATION SCORE" are the same as those described with reference to FIG. 9 except that each of the base points shown in FIG. 11 is 50 times as many as the relevant evaluation score in FIGS. 9 and 11 in conformity with the scale of the corresponding evaluation score in the actual job performance database 110 shown in FIG. 9 and the actual simulator performance database 111 shown in FIG. 11.

The skill level calculation part 105 calculates a total sum value of the evaluation scores of the respective job items in the actual job performance database 110, the evaluation scores of the respective job items in the actual simulator performance database 111, and the evaluation scores of the respective job items in the actual examination performance database 112. For example, the sum value of the evaluation scores in the actual job performance database 110 is 410 (=60+20+60+45+225), the sum value of the evaluation scores in the actual simulator performance database 111 is 275 (=82+54+45+24+70), and the sum value of the evaluation scores in the actual examination performance database 112 is 200 (=50+150). Therefore, a final sum total value of the evaluation scores calculated for the group of "MACHINE WEIGHT RANGE: 3 t-5 t", "ATT TYPE: STANDARD", and "LEADING END ATT TYPE: BUCKET" results in 885 (=410+275+200). It is understood from the rank determination table T3 that the final sum total value "885" is ranked "S". In this respect, the skill level calculation part 105 calculates the skill level of the operator as the rank "S" for the group of "MACHINE WEIGHT RANGE: 3 t-5 t", "ATT TYPE: STANDARD", and "LEADING END ATT TYPE: BUCKET". Moreover, if the operator has another actual job performance for another group of "MACHINE WEIGHT RANGE", "ATT TYPE", and "LEADING END ATT TYPE", the skill level calculation part 105 calculates a total sum value of evaluation scores and calculates the skill level for the group.

It is sufficient that the skill level calculation part 105 executes the process of calculating the skill level every time when one of the actual job performance database 110, the actual simulator performance database 111, and the actual examination performance database 112 is updated, thereby updating the skill level registered in the operator database 109.

Referring back to FIG. 1, the database management part 106 manages the first database 107, the second database 108, the operator database 109, the actual job performance database 110, the actual simulator performance database 111, and the actual examination performance database 112.

When acquiring the operation request information from the orderer terminal 20, the database management part 106 stores the acquired operation request information in the first database 107.

When acquiring the master device information from the master device 30, the database management part 106 stores the master device information in the second database 108.

When acquiring a simulation result from the master device 30, the database management part 106 further updates the actual simulator performance database 111 in accordance with the simulation result. In this manner, results of the simulation performance executed by the operator are accumulated as a history in the actual simulator performance database 111.

Further, in a case where the operator receives a judgment result of an examination for a specific job item, the database management part 106 updates the actual examination performance database 112 in accordance with the judgment result. The examination is, for example, a test provided by a provider of the operation selection system.

Moreover, when acquiring an actual job performance for an actual job item, the database management part 106 updates the actual job performance database 110 in accordance with the acquired actual job performance.

As described above, provided in the embodiment is the system where the operator can do order acceptances for more jobs after improving the skill level by increasing the trainings using the simulator and passing more examinations in addition to the actual job performance. Accordingly, the system can motivate the operator to improve the operator's skill level by way of the simulator and the examinations using spare moments between actual operations with the aim of raising the overall skill level of the operator.

Referring back to FIG. 1, the master device 30 includes the display part 301, a control part 302, an operation part 303, and the communication part 304. The display part 301 includes a display device such as a liquid crystal display located in front of the operating seat of the master device 30. The control part 302 includes a computer and controls the entirety of the master device 30. For instance, the control part 302 acquires a peripheral image of the construction machine 50 by using an unillustrated camera included in the construction machine 50 via the communication part 304, and causes the display part 301 to display the acquired image in real time. Moreover, the control part 302 causes the communication part 304 to transmit to the slave device 40 a signal representing an input manipulative amount corresponding to the manipulation to the operation part 303, and remotely manipulates the construction machine 50 via the slave device 40.

Besides, when the communication part 304 receives a reservation request from the server 10, the control part 302 stores the reservation request in an unillustrated memory. The reservation request includes an operator ID of an operator who executes an operation, a password of the operator, and information indicating the operation to be executed by the operator. The information indicating the operation includes a site name of a site where the operation is executed, information of job items, and information of an operation time set.

The operation part 303 includes various manipulation levers corresponding to various manipulation levers provided at the operating seat device of the construction machine 50 so that the operator receives an input of remotely manipulating the construction machine 50. The operation part 303 further includes various buttons for each receiving an input of information such as the operator ID and the password.

The communication part 304 includes a communicator which connects the master device 30 with the network NT1 and the communication channel NT2.

The information terminal device 60 includes a communication part 601, a display control part 602, a display part 603, and an operation part 604. The communication part 601 (which is an exemplary "second communication part") includes a communicator connecting the information terminal device 60 with the network NT1. In the embodiment, the communication part 601 receives the first display data and the second display data sent from the server 10. The communication part 601 transmits to the server 10 a first selection instruction containing information indicating an operation selected by the operator via the operation selection image G51. The communication part 601 transmits a second selection instruction containing a master device ID of a master device 30 selected by the operator via the master device selection screen image.

The display control part 602 generates, based on the first display data received by the communication part 601, the display image G5 including the operation selection image G51 which causes the display part 603 to display the generated display image G5.

The display part 603 includes a display device such as a liquid crystal display and displays the display image G5 under the control by the display control part 602.

The operation part 604 includes an input device such as a keyboard or a mouse, and receives various inputs by the operator.

Figure 13:
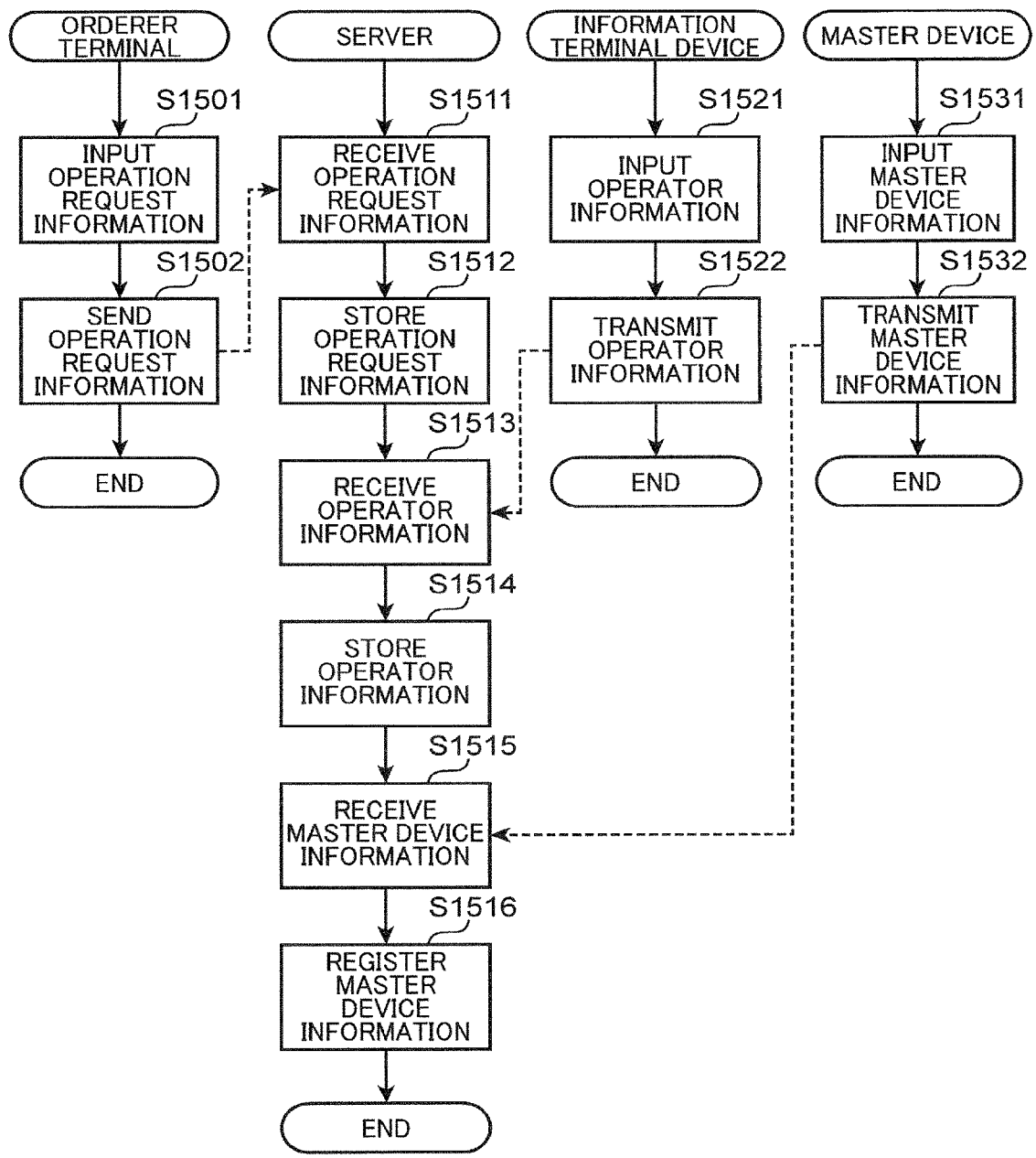
FIG. 13 shows a flowchart of a process of registering various kinds of information in a server included in the operation selection system.

FIG. 13 shows a flowchart of a process of registering various kinds of information in the server 10 in the operation selection system.

The operation part 203 of the orderer terminal 20 receives operation request information input by an orderer in step S1501. In step S1502, the control part 202 of the orderer terminal 20 sends the operation request information received by the operation part 203 to the server 10. The various kinds of information input via the operation input screen image G1 shown in FIG. 2A is sent as the operation request information.

The communication part 101 of the server 10 receives the operation request information in step S1511. In step S1512, the database management part 106 of the server 10 stores in the first database 107 the operation request information received by the communication part 101. Consequently, the operation request information including "SITE NAME", "MACHINE INFORMATION", "JOB ITEM", "REQUIRED LEVEL", "REMUNERATION", and "OPERATION TIME SET" is stored in combination with one another in the first database 107.

In step S1521, the operation part 604 of the information terminal device 60 receives an input of operator information including "OPERATOR ID", "NAME", "COUNTRY", "EMAIL ADDRESS" and "PASSWORD" concerning the operator. The communication part 601 of the information terminal device 60 transmits the operator information to the server 10 in step S1522. For instance, the operator inputs the operator information when newly registering the operator in the operating selection system. After the registration, the operator can log in the operation selection system by using the operator ID and the password contained in the operator information.

The communication part 101 of the server 10 receives the operator information from the information terminal device 60 in S1513. In step S1514, the database management part 106 of the server 10 stores in the operator database 109 the operator information received by the communication part 101. Consequently, "OPERATOR ID", "NAME", "MAIL ADDRESS", and "PASSWORD" concerning the operator are stored in the corresponding columns in the table T1 of the operator database 109 shown in FIG. 8.

The operation part 303 of the master device 30 receives an input of master device information from a master device manager in step S1531. Here, the master device information is input, for example, by the master device manager when the master device 30 is newly registered in the operation selection system. The input action may be executed when the master device 30 is newly provided in a facility, or may be executed at an appropriate time thereafter.

The communication part 304 of the master device 30 transmits the input master device information to the server 10 in step S1532. The communication part 101 of the server 10 receives the master device information in step S1515.

In step S1516, the database management part 106 of the server 10 stores in the second database 108 the master device information received by the communication part 101. In this manner, the second database 108 stores the master device ID of the relevant master device 30, the master device name, the location of the master device 30, and the rental fee therefor.

Figure 14:
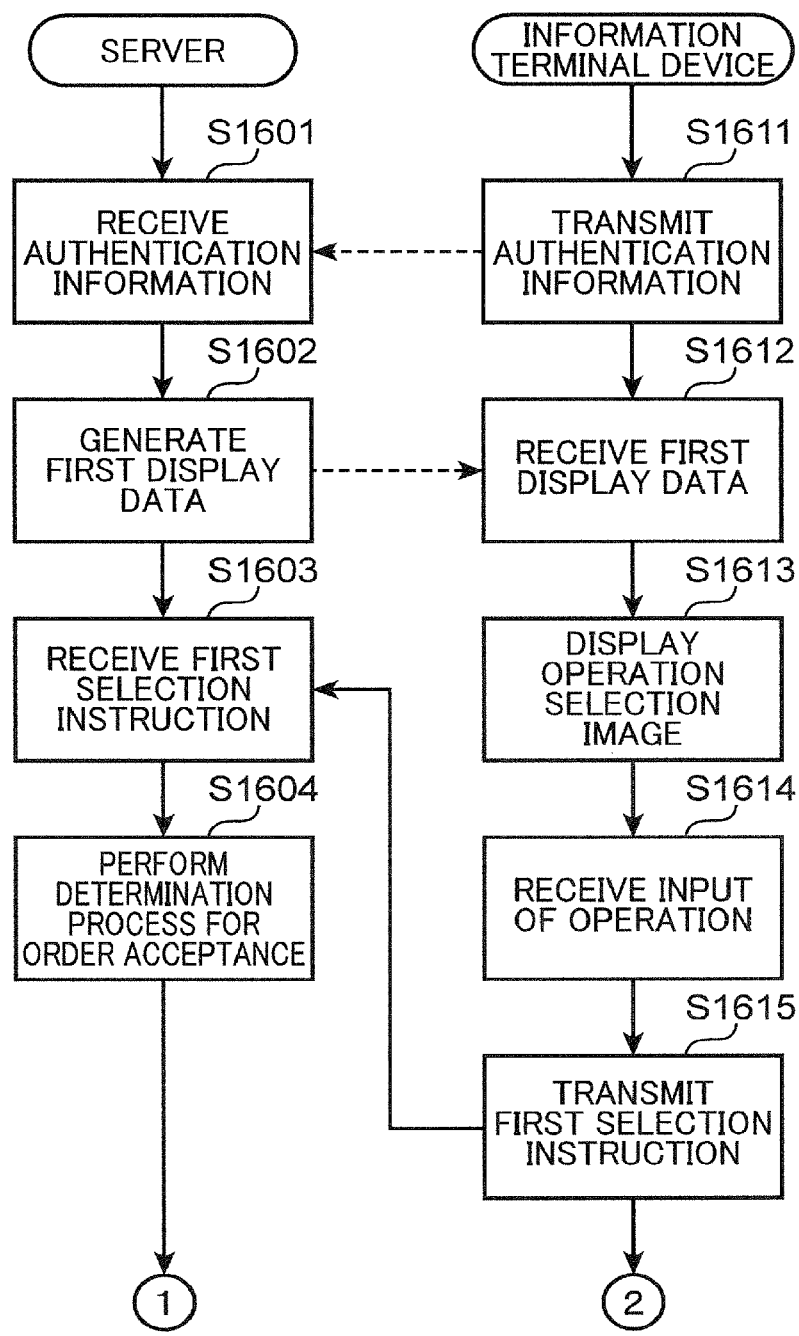
FIG. 14 shows a flowchart of a process executed by the operation selection system when the operator selects the operation.
Figure 15:
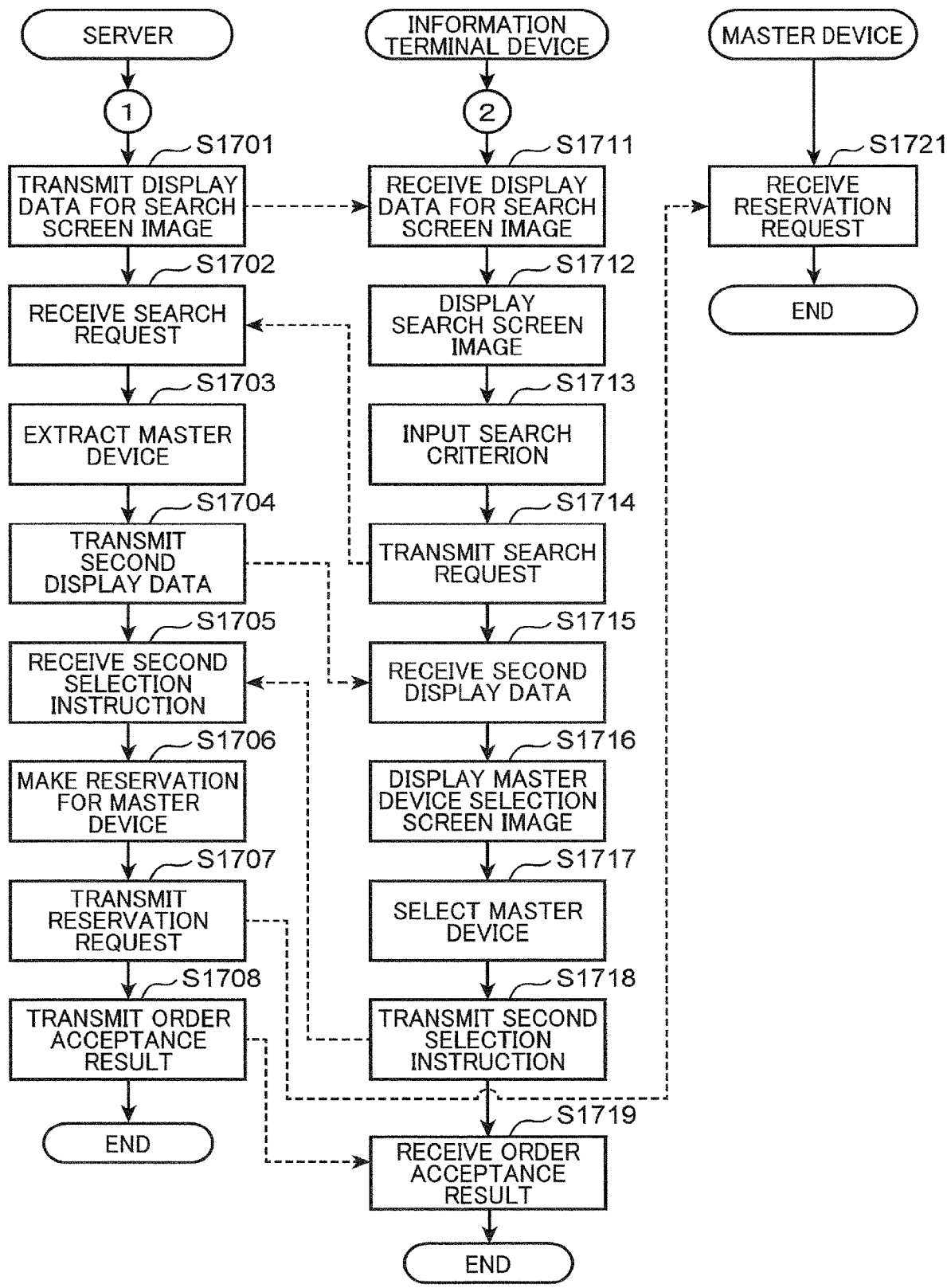
FIG. 15 is a flowchart which is continuous from FIG. 14.

FIG. 14 shows a flowchart of a process of the operation selection system when the operator selects an operation. FIG. 15 is a flowchart which is continuous from FIG. 14. In step S1611, the communication part 601 of the information terminal device 60 transmits to the server 10 authentication information input by the operator via the operation part 604. The authentication information includes an operator ID and a password.

The communication part 101 of the server 10 receives the authentication information in step S1601. At this time, the server 10 allows the flow to proceed to step S1602 by permitting the operator to log in the system under the condition that the operator ID and the password transmitted as the authentication information is registered in the operator database 109. If the operator ID and the password transmitted as the authentication information is not registered in the operator database 109, the server 10 sends a message notifying the failed login to the information terminal device 60.

In step S1602, the display data generation part 102 generates, based on the operation request information stored in the first database 107, first display data which causes the information terminal device 60 to display the display image G5 including the operation selection image G51, and uses the communication part 101 to transmit the generated first display data to the information terminal device 60.

The communication part 601 of the information terminal device 60 receives the first display data in step S1612. In step S1613, the display control part 602 of the information terminal device 60 generates the display image G5 based on the first display data, and causes the display part 603 to display the generated display image G5. As a result, the operator is presented with the display image G5 including the operation selection image G51 and the operation schedule image G52 shown in FIGS. 6A and 6B.

In step S1614, the operation part 604 of the information terminal device 60 receives an input of an operation selected by the operator via the operation selection image G51. Specifically, the operator selects a desired operation from the operation selection image G51, and executes an input of the selected operation to the operation schedule image G52. The operation selection continuously proceeds.

In step S1615, the communication part 601 of the information terminal device 60 transmits to the server 10 a first selection instruction containing information indicating the selected operation and an operator ID of the operator having selected the operation. The communication part 101 of the server 10 receives the first selection instruction in step S1603.

In step S1604, the order acceptance management part 104 of the server 10 performs a determination process of determining whether the skill level of the operator is equal to or higher than a required skill level required for the operation selected by the operator. The determination process is described in detail above, and hence the explanation therefor is omitted. As a result of the determination process, the flow proceeds to step S1701 shown in FIG. 15 when the skill level of the operator is determined to be equal to or higher than the required skill level. Conversely, the flow does not proceed to step S1701 shown in FIG. 15 when the skill level of the operator is determined to be lower than the required skill level. In this case, the order acceptance management part 104 may send a massage notifying the failed acceptance of the order acceptance for the selected operation to the information terminal device 60.

In step S1701, the display data generation part 102 of the server 10 uses the communication part 101 to transmit, to the information terminal device 60, display data of a search screen image for allowing the operator to search a master device 30.

The communication part 601 of the information terminal device 60 receives the display data of the search screen image in step S1711. In step S1712, the display control part 602 of the information terminal device 60 generates the search screen image based on the display data of the search screen image and causes the display part 603 to display the generated search screen image.

Figure 16:
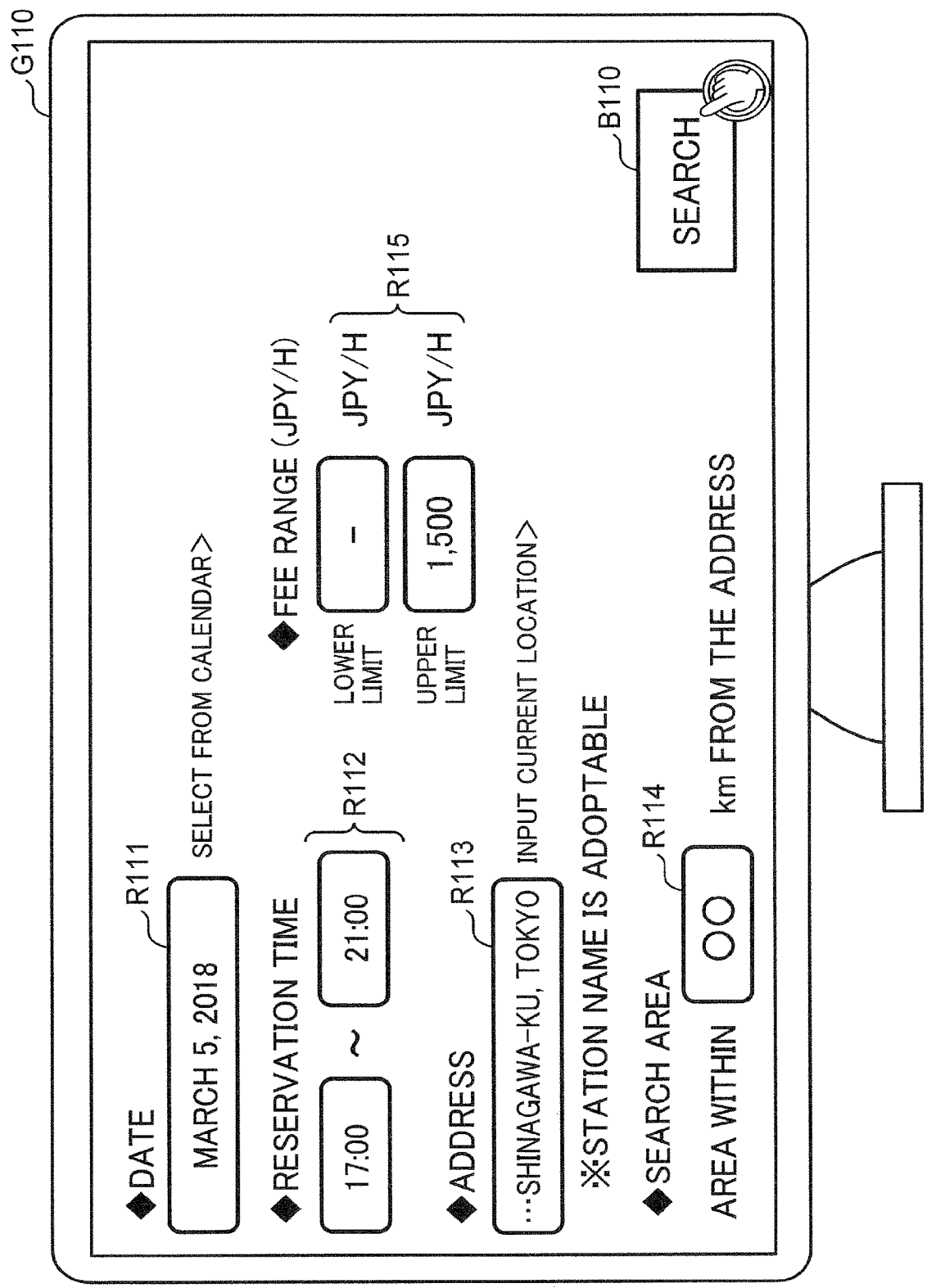
FIG. 16 shows a search screen image displayed on the information terminal device.

FIG. 16 shows a search screen image G110 displayed on the information terminal device 60. The search screen image G110 includes a date input section R111, a reservation time input section R112, an address input section 8113, a search area input section R114, and a fee range input section R115.

The date input section R111 receives an input of a desired date for a reservation for a master device 30 from the operator. When the date input section R11 receives the input of the desired date, one or master devices 30 which are available on the date is searched. The reservation time input section R112 receives an input of a desired reservation time for a master device 30 by the operator. When the reservation time input section R112 receives the input of the reservation time, one or more master devices 30 which are available at the reservation time is searched.

The address input section R113 receives an input of a desired location for an operation by the operator. The desired location for the operation does not mean an actual work site for the operation, but indicates a location of a relevant master device 30. The address input section R113 may receive art input of the address of the desired location for the operation, or an input of a name of a place, e.g., a name of a station, representative of the area therearound. The search area input section R114 receives an input of a search area for searching a master device 30 depending on a specific radial area from the center of the place input in the address input section. R113. The fee range input section R115 receives an input of a fee range of a rental fee desired by the operator for a master device 30. The fee range input section R115 includes a subsection for an input of art upper limit of the rental fee, and a subsection for an input of a lower limit of the rental fee. After the fee range input section R115 receives the input of the fee range, one or more master devices 30 meeting the fee range is searched. Here, the operator can fill only a desired search item by inputting a corresponding search criterion without the necessity of filling the various search items displayed on the search screen image G110 by inputting corresponding search criteria.

Referring back to FIG. 15, the operation part 604 of the information terminal device 60 receives the search criterion input by the operator via the search screen image G110 in step S1713. In step S1714, the communication part 601 of the information terminal device 60 transmits the input search criterion as a search request to the server 10. The communication part 601 may transmit the search request to the server 10 in response to an action of pushing a search button B110, as a trigger, on the search screen image G110.

The communication part 101 of the server 10 receives the search request in step S1702. In step S1703, the extraction part 103 of the server 10 extracts from the second database 108 one or more master devices 30 which meet the search criterion designated by the search request.

For the search criterion of the reservation date and time, the extraction part 103 may extract one or more master devices 30 which are available at the reservation time on the date with reference to the operation plan database 113 shown in FIG. 7. Further, for the search criterion of the search area, the extraction part 103 may extract one or more master devices 30 located in the search area with reference to the information stored in the column "LOCATION" in the second database 108. Additionally, for the search criterion of the fee range, the extraction part 103 may extract one or more master devices 30 whose respective rental fees are in the fee range with reference to the information stored in the column "RENTAL FEE" in the second database 108.

In step S1704, the display data generation part 102 of the server 10 generates second display data which causes the information terminal device 60 to display a desired master device selection screen image for allowing a selection of a desired master device 30 among the master devices 30 extracted in step S1703, and uses the communication part 101 to transmit the generated second display data to the information terminal device 60.

The communication part 601 of the information terminal device 60 receives the second display data in step S1715. In step S1716, the display control part 602 of the information terminal device 60 generates the master device selection screen image based on the second display data which causes the display part 603 to display the generated master device selection screen image.

Figure 17:
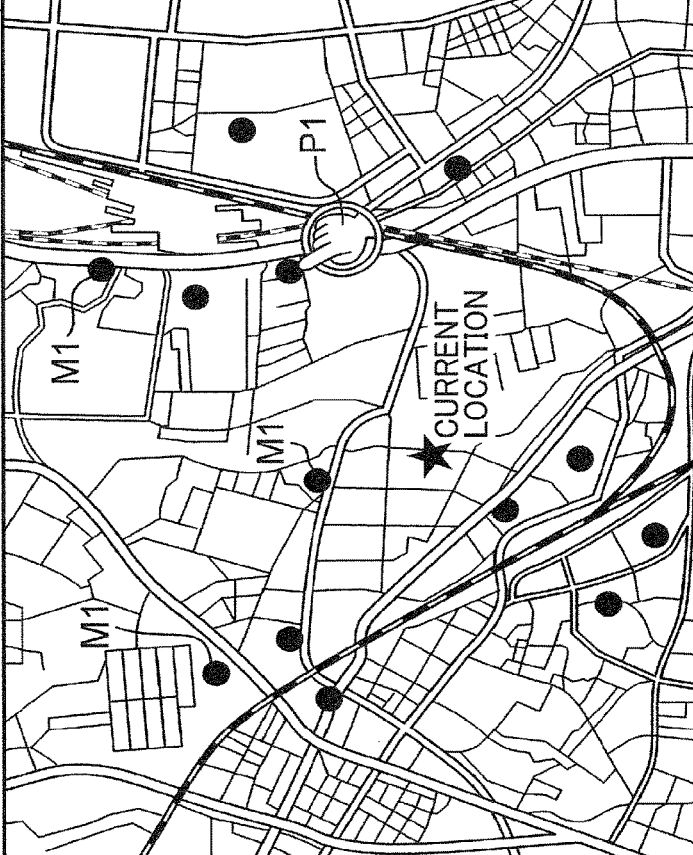
FIG. 17 shows a master device selection screen image displayed on the information terminal device.

FIG. 17 shows a master device selection screen image G120 displayed on the information terminal device 60. The master device selection screen image G120 includes a map view G1211 showing a mark M1 denoting a facility where each of the master devices 30 which meet the search criterion is located. The master device selection screen image G120 further includes a basic information display section 8121 showing basic information concerning the facility, and an availability display section R122 showing a time basis availability of the master device 30 located in the facility.

The operator uses the operation part 604 to move and position the pointer P1 on one of the marks M1 corresponding to a desired facility. Upon the positioning, the display control part 602 displays the basic information concerning the facility in the basic information display section R121. Here, the basic information display section R121 shows the address of the facility, an access way thereto, a rental fee therefor, and information of total evaluation thereof. The total evaluation is expressed with a numeric value obtained by collecting evaluations of the facility by operators who have used the master device 30 in the facility in past. The date input as a search criterion by the operator is displayed above the basic information display section R121.

Figure 18:
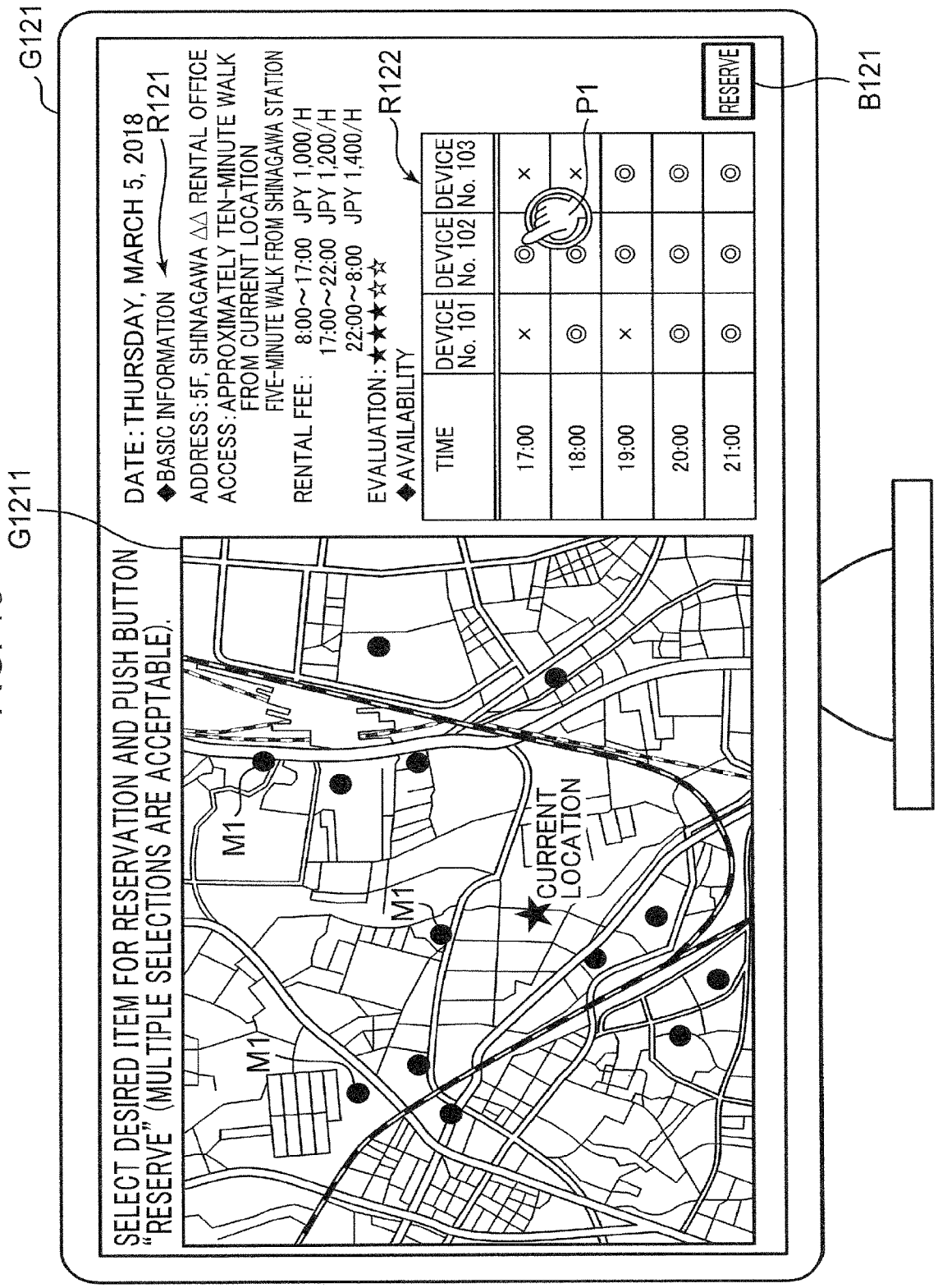
FIG. 18 shows a master device selection screen image displayed on the information terminal device.

The operator having decided to make a reservation for the facility with reference to the basic information display section R121 positions the pointer P1 in the availability display section R122. In response to the positioning, the display control part 602 causes the display part 603 to display a master device selection screen image G121 shown in FIG. 18. FIG. 18 shows the master device selection screen image G121 displayed on the information terminal device 60. The master device selection screen image G121 differs from the master device selection screen image G120 in the pointer P1 displayed in the availability display section R122 and the message displayed above the map view G1211.

The availability display section R122 shows the time basis availability of each of the master devices 30 in the facility with the signs of "⊙" and "×". The sign "⊙" denotes that no reservation is made for each of the relevant master devices 30 at a relevant time, and the sign "×" denotes that a reservation is made for each of the master devices 30 at a relevant time. The operator can make a reservation for a desired master device 30 at a desired time by selecting a selection cell having the sign "⊙" from the availability display section R122.

Specifically, the operator selects a desired selection cell among selection cells each having the sign "⊙" by positioning the pointer P1 in the desired selection cell in the availability display section R122. Further, it is possible to select a plurality of selection cells in the availability display section R122. Therefore, the operator aiming at selecting another selection cell may position the pointer P1 in a corresponding selection cell for the cell selection. In this case, each of the selection cells selected by the operator may be displayed in a different color to clarify the selection. Moreover, when cancelling the once selected selection cell, the operator may reposition the pointer P1 in the selected selection cell. Upon final decision for each of the selection cells, the operator may push a reservation button B121 displayed on a right-lower part of the master device selection screen image G121.

Referring back to FIG. 15, the operation part 604 of the information terminal device 60 receives an input of the selection of the master device 30 from the operator via the master device selection screen image G121 in step S1717.

In step S1718, the communication part 601 of the information terminal device 60 transmits to the server 10 a second selection instruction containing the master device ID of the selected master device 30. In the exemplary master device selection screen image G121 shown in FIG. 18, a selection cell in the availability display section R122 is selected. At the same time, a reservation time for the master device 30 is also selected in accordance with the selection. Accordingly, the second selection instruction contains information of the reservation date and the reservation time in addition to the master device ID.

The communication part 101 of the server 10 receives the second selection instruction in step S1705. In step S1706, the order acceptance management part 104 of the server 10 places a reservation for a master device 30 to be used for an operation by storing, in the operation plan database 113, an operator ID designated by the second selection instruction in combination with the information indicating the operation ordered in step S1604.

In this case, the order acceptance management part 104 confirms the reservation for the master device 30 when the reservation time designated by the second selection instruction matches a time operation segment for the operation for which the order acceptance is received in step S1604, or includes the time operation segment for which the order acceptance is received in step S1604, and then the flow proceeds to S1707. Conversely, when the reservation time designated by the second selection instruction does not match the operation time segment for the operation for which the order acceptance is received in step S1604 or does not include the operation time segment for the operation for which the order acceptance is received in step S1604, the order acceptance management part 104 may refuse the reservation for the master device 30. In this case, the order acceptance management part 104 may transmit to the information terminal device 60 a message of requiring another selection of a different master device 30. The order acceptance management part 104 then further allows the operator to select such a different master device 30 via the master device selection screen image G121.

In step S1707, the order acceptance management part 104 of the server 10 uses the communication part 101 to transmit a reservation request to the master device 30 confirmed for the reservation in step S1706. The reservation request contains information indicating the operator ID of the operator having made the reservation for the master device 30, the reservation date, the reservation time, an access code of the operator, and the operation selected by the operator. The communication part 304 of the master device 30 receives the reservation request in step S1721. In this case, the control part 302 of the master device 30 stores the information contained in the reservation request in the memory of the master device 30. In this manner, the master device 30 can manage the operator, the operation to be executed by the operator, and the time for the operation in combination with one another. Additionally, the memory stores the access code. Thus, the master device 30 permits the operator to remotely manipulate the construction machine 50 upon receipt of an input of the access code from the operator at the reservation time.

In step S1708, the order acceptance management part 104 of the server 10 uses the communication part 101 to transmit display data which causes the information terminal device 60 to display an order acceptance result screen image showing receipt of the operation order acceptance. In the information terminal device 60, the communication part 601 receives the display data, and the display control part 602 causes the display part 603 to display the order acceptance result screen image in step S1719.

FIG. 19 shows an order acceptance result screen image G140. The order acceptance result screen image G140 includes a display section R141 showing contents of operations whose order acceptances are received, a master device display section R142 showing information concerning reserved master devices 30, and a map view G141 showing the locations of the reserved master devices 30.

The display section R141 includes columns of "OPERATOR INFORMATION" and "OPERATION TIME SET". The column "OPERATOR INFORMATION" shows the operator ID of the operator who executes the operations, and the operator's name. The column "OPERATION TIME SET" is defined by horizontally extending operation time axes and vertically extending job item axes. Job items and operation time segments defined in this manner are displayed in combination with each other. The example shows an order acceptance of an operation W1 for "FLAT GROUND PREPARATION" on a site B for two operation time segments from 8:00 to 9:00. Furthermore, another order acceptance is received for an operation W2 for "FLAT GROUND PREPARATION" on a site A for two operation time segments from 10:00 to 11:00. Additionally, it is seen from the example that order acceptances for operations W3, W4 are received. Furthermore, an hourly wage to be given for the operator is shown in the cells of the operation W1. In contrast, a total remuneration to be given for the operator is shown in the cells of the operation W4 received under a lump order acceptance instead of an hourly wage. Moreover, the display section R141 further includes the column of "EXPECTED INCOME" at the right end thereof. The column "EXPECTED INCOME shows a total amount of the remuneration to be given for the operator for each of the operations W1 to W4.

The master device display section R142 shows the location of the master device 30 reserved for each of the operations W1, W2 for "FLAT GROUND PREPARATION" in the first row, the location of the master device 30 reserved for the operation W3 for "DEMOLITION OF BUILDING" in the second row, and the location of the master device 30 reserved for the operation W4 for "SLOPE PREPARATION" in the third row.

The map view G141 shows marks M1, M2, M3 denoting the respective locations of the master devices 30 shown in the master device display section R142. Besides, the master device display section R142 shows these marks M1, M2, M3 used in the map view G141. The operator can therefore easily understand which master device 30 in a relevant location should be used for a selected time segment.

In FIG. 19, the displaying of the marks M1 to M3 in the map view G141 and the master device display section R142 achieves the association between the master devices 30 and their respective locations. However, the displaying way is a mere example. For instance, the corresponding master device ID may be displayed next to each of the marks M1 to M3, or the master device ID is displayed in place of the marks M1 to M3 in the map view G141 and the master device display section R142. Alternatively, the map view G141 may show the marks M1 to M3 in different shapes denoting the respective locations of the master devices 30, and the master device display section R142 may show the marks M1 to M3 used in the map view G141 at the respective right ends of the information of the master devices 30 in the master device display section R142. As a further alternative option, the map view G141 may show the marks M1 to M3 in different colors denoting the locations of the master devices 30, and the master device display section R142 shows the rows of the information of the master devices 30 in the different colors corresponding to those used in the map view G141.

The same master device 30 is reserved for the operations W1, W2 as shown in the master device display section R142 regardless of their different sites as shown in the display section R141. It is seen from this perspective that the operator can start the operation W2 on the site A immediately after finishing the operation W1 on the site B while staying at the same location without moving from the site A to the site B. This can remarkably improve the operational efficiency of the operator.

Conclusively, according to the embodiment, the operator carrying the information terminal device 60 can select an operation including a desired job item for a desired time segment via the operation selection image G51, and select a desired master device to be used for the operation via the master device selection screen image G120. Consequently, the configuration of the embodiment permits the operator to easily select the desired operation and the desired master device 30 for the desired operation by using the information terminal device 60.

Meanwhile, the present invention can adopt modifications described below.

(1) Although the operation selection image G51 and the master device selection screen images G120, G121 are independently displayed in the embodiment, the display way should not be limited thereto. For example, these images may be combined as a single selection screen image. In this case, the operator can select the operation and the master device 30 at the same time. Moreover, in this case, the first selection instruction and the second selection instruction may be integrally sent as a single selection instruction set.

(2) The operation plan database 113 shown in FIG. 1 may include the second database 108. In this case, the extraction part 103 can extract one or more master devices 30 which are available at a reservation time on a reservation date designated as a search criterion.

Summary of Embodiments

Technical features of the embodiment will be summarized below.

An operation selection system according to one aspect of the invention is an operation selection system for allowing an operator who remotely manipulates a construction machine by a remote manipulating device to select an operation ordered by an orderer, the operation selection system including: an information terminal device which allows the operator to select the operation; a server communicatively connected with the information terminal device via a network, wherein the server includes: a first database which stores operation request information concerning one or more operations ordered by the orderer in advance; a second database which stores remote manipulating device information including at least an identifier of one or more remote manipulating devices in advance; display data generation part which generates, based on the operation request information and the remote manipulating device information, display data which causes the information terminal device to display a selection image for allowing the operator to select a desired operation among the one or more operations and a desired manipulation device among the one or more manipulating devices; and a first communication part which transmits the display data to the information terminal device, the information terminal device includes: a second communication part which receives the display data; a display control part which generates the selection image based on the display data and causes a display part to display the generated selection image; an operation part which receives a selection instruction of the operator who selects the desired operation and the desired manipulating device via the selection image, the second communication part transmitting the selection instruction to the server, and the server further includes an order acceptance management part which receives an operation order acceptance of the operator by storing an identifier of the operator, an identifier of the remote operating device designated by the selection instruction, and the operation designated by the selection instruction in combination with one another.

According to the configuration, generated is the display data which causes the information terminal device to display the selection image for allowing the operator to select a desired operation among one or more operations ordered by the orderer and a desired remote manipulating device among one or more remote manipulating devices based on the operation request information concerning the one or more operations and remote manipulating device information including at least the identifier of the one or more remote manipulating devices. The generated display data is transmitted to the information terminal device.

The operator then selects the desired operation and the desired remote manipulating device via the selection image, and the selection instruction is sent to the server. The server having received the selection instruction receives the operation order acceptance of the operator by storing the identifier of the operator, the identifier of the remote manipulating device designated by the selection instruction, and the operation designated by the selection instruction in combination with one another. In this way, the operator can make an operation schedule by desirably selecting the operation and the remote manipulating device at the operator's convenience by using the information terminal device. This configuration therefore permits the operator to easily select the desired operation and the desired remote manipulating device for executing the operation by using the information terminal device.

In this configuration, the operation request information may include job items and operation time segments, the selection image may show the job items and the operation time segments in combination with each other in such a way as to allow a selection of a desired one of the job items and a desired one of the operation time segments, the selection instruction may include an instruction of selecting the desired job item, an instruction of selecting the desired time segment for the selected job item, and an instruction of selecting a remote manipulating device for use in the selected desired operation time segment via the selection image, and the order acceptance management part may receive the operation order acceptance of the operator by storing the identifier of the operator, the job item designated by the selection instruction, the desired time segment designated by the selection instruction, and the identifier of the remote manipulating device designated by the selection instruction.

According to the configuration, the selection image selectively shows the desired job item among the job items and the desired operation time segment among the operation time segments. Hence, the operator can make an operation schedule by selecting the desired operation time segment, the desired job item, and the desired remote manipulating device by using the information terminal at the operator's convenience, and thus have an increased permissible selectivity in selecting the operation.

In this configuration, the first communication part may receive from the information terminal device a search criterion made by the operator to the remote manipulating device, the server may further include an extraction part which extracts from the second database the remote manipulating device that meets the search criterion, and the selection image may include a search result view showing the extracted remote manipulating device.

According to the configuration, remote manipulating devices which meet the search criterion inputted by the operator are extracted. Thus, the operator can select the desired remote manipulating device among the extracted remote manipulating devices. As a result, it is possible to reduce the burden on the operator for selecting the desired remote manipulating device.

In this configuration, the remote manipulating device information may include information of a location of the remote manipulating device, and the search criterion may include a criterion of searching the remote manipulating device in order of a short distance thereto from a position of the information terminal device or a position designated by the operator.

According to the configuration, the operator can select the desired remote manipulating device among remote manipulating devices located closer to the information terminal device.

In this configuration, the remote manipulating device information may include information of a usage fee of the remote manipulating device, and the search criterion may include a criterion of searching the remote manipulating device in order of usage fee, beginning with the lowest or with the highest.

According to the configuration, the operator can easily select the desired remote manipulating device among remote manipulating devices searched in order of the usage fee, beginning with the lowest or with the highest.

In this configuration, the remote manipulating device information may include information of a reservation date and a reservation time for the remote manipulating device, the search criterion may include a criterion of designating the reservation date and reservation time for the remote manipulating device, and the extraction part may extract from the second database the remote manipulating device which is available at the reservation time on the reservation date designated as the search criterion.

According to the configuration, the operator can easily select the desired manipulating device among remote manipulating devices which are available for a desired time on a desired date for the operation.

In this configuration, the selection image may include a map view showing the location of the remote manipulating device extracted by the extraction part.

According to this configuration, the selection image includes the map view showing the location of the remote manipulating device which meets the search criterion. Therefore, the operator can easily grasp the location of the remote manipulating device.

In this configuration, the operation request information may further include a first remuneration for a lump order acceptance for an entirety of the operation time segments, and a second remuneration lower than the first remuneration for a partial order acceptance for a part of the operation time segments, and the selection image may show the first remuneration and the second remuneration in connection with the job item.

According to the configuration, a remuneration is higher under the lump order acceptance for the entirety of the operation time segments than that under the partial order acceptance for a part of the operation time segments, and hence it is possible to motivate the operator to choose the lump order acceptance. In this case, such a lump order acceptance of the job item for the entirety of the operation time segments by the operator alone is convenient for the orderer in terms of a reduction in the burden of operation schedule management. In contrast, the partial order acceptance for a part of the operation time segments allows the operator to select a desired time segment for the operation at the operator's convenience even through the remuneration of the partial order acceptance is lower than that for the lump order acceptance.

In this configuration, the operation request information may further include a first required skill level required for the operator under the lump order acceptance for the entirety of the operation time segments, and a second required skill level required for the operator under the partial order acceptance for a part of the operation time segments, the server may further include an operator database which stores respective skill levels of a plurality of operators, and the order acceptance management part may acquire from the operator database the skill level of the operator having sent the selection instruction among the plurality of operators when the second communication part receives the selection instruction, and accepts the order acceptance of the operator satisfying a condition of skill level equal to or higher than the first required skill level in a case where the selection instruction indicates the lump order acceptance and accepts the order acceptance of the operator satisfying a condition of skill level equal to or higher than the second required skill level in a case where the selection instruction indicates the partial order acceptance.

According to this configuration, the orderer can preferably set a required skill level, i.e., the first required skill level, under the lump order acceptance, and another required skill level, i.e., the second required skill level, under the partial order acceptance in accordance with a job item in the operation ordered by the orderer, thereby accepting the order acceptance of the operator having the skill level equal to or higher than the corresponding required skill level.

The invention claimed is:

1. An operation selection system for allowing an operator who remotely manipulates a construction machine by a remote manipulating device to select an operation ordered by an orderer, the operation selection system comprising:
 an information terminal device which allows the operator to select the operation;
 a server communicatively connected with the information terminal device via a network, wherein the server includes:
  a first database which stores operation request information concerning one or more operations ordered by the orderer in advance;
  a second database which stores remote manipulating device information including at least an identifier of one or more remote manipulating devices in advance;
  a display data generation part which generates, based on the operation request information and the remote manipulating device information, display data which causes the information terminal device to display a selection image for allowing the operator to select a desired operation among the one or more operations and a desired manipulation device among the one or more remote manipulating devices; and
  a first communication part which transmits the display data to the information terminal device,
 the information terminal device includes:
  a second communication part which receives the display data;
  a display control part which generates the selection image based on the display data and causes a display part to display the generated selection image;
  an operation part which receives a selection instruction of the operator who selects the desired operation and the desired manipulating device via the selection image, the second communication part transmitting the selection instruction to the server,
 the server further includes an order acceptance management part which receives an operation order acceptance of the operator by storing an identifier of the operator, an identifier of the remote operating device designated by the selection instruction, and the operation designated by the selection instruction in combination with one another,
 the selection image includes an operation selection image and an operation schedule image,
 the operation selection image shows job items and operation time segments in combination with each other,
 the operation schedule image shows one or more operation time segments selected by the operator from an operation time set shown in the operation selection image and each of the job items in combination with each other,
 the first communication part receives from the information terminal device a search criterion made by the operator to the remote manipulating device,
 the server further includes an extraction part which extracts from the second database a remote manipulating device that meets the search criterion, and
 the selection image includes a search result view showing the extracted remote manipulating device,
 wherein the remote manipulating device information includes information of a location of the remote manipulating device, and
 the search criterion includes a criterion of searching the remote manipulating device in order of a short distance thereto from a position of the information terminal device based on location information provided from a global positioning system (GPS) sensor included in the information terminal device,
 wherein
 the operation request information further includes a required skill level required for the operator under the order acceptance,
 the server further includes an operator database which stores respective skill levels of a plurality of operators, wherein a time required to complete any of the plurality of job items is automatically received based on actual performance by the plurality of operators on a job simulator, and the order acceptance management part acquires from the operator database the skill level of the operator having sent the selection instruction among the plurality of operators when the second communication part receives the selection instruction, and automatically accept the order acceptance of the operator when a condition of skill level equal to or higher than the required skill level in a case where the selection instruction indicates the acceptance, and notify the operator of failed acceptance of the order acceptance when a condition of skill level is not equal to or higher than the required skill level.

2. The operation selection system according to claim 1, wherein
the operation request information includes the job items and the operation time segments,
the selection image shows the job items and the operation time segments in such a way as to allow a selection of a desired one of the job items and a desired one of the operation time segments,
the selection instruction includes an instruction of selecting the desired job item, an instruction of selecting the desired time segment for the selected job item, and an instruction of selecting a remote manipulating device for use in the selected desired operation time segment via the selection image, and
the order acceptance management part receives the operation order acceptance of the operator by storing the identifier of the operator, the job item designated by the selection instruction, the desired time segment designated by the selection instruction, and the identifier of the remote manipulating device designated by the selection instruction.

3. The operation selection system according to claim 2, wherein
the operation request information further includes a first remuneration for a lump order acceptance for an entirety of the operation time segments, and a second remuneration lower than the first remuneration for a partial order acceptance for a part of the operation time segments, and
the selection image shows the first remuneration and the second remuneration in connection with the job item.

4. The operation selection system according to claim 1, wherein
the remote manipulating device information includes information of a usage fee of the remote manipulating device, and
the search criterion includes a criterion of searching the remote manipulating device in order of usage fee, beginning with the lowest or with the highest.

5. The operation selection system according to claim 1, wherein
the remote manipulating device information includes information of a reservation date and a reservation time for the remote manipulating device,
the search criterion includes a criterion of designating the reservation date and reservation time for the remote manipulating device, and
the extraction part extracts from the second database the remote manipulating device which is available at the reservation time on the reservation date designated as the search criterion.

6. The operation selection system according to claim 1, wherein
the selection image includes a map view showing the location of the remote manipulating device extracted by the extraction part.

7. An operation selection method for use in an operation selection system for allowing an operator who remotely manipulates a construction machine by a remote manipulating device to select an operation ordered by an orderer, the operation selection method comprising:
generating, based on operation request information concerning one or more operations ordered by the orderer and remote manipulating device information including at least an identifier of one or more remote manipulating devices, display data which causes an information terminal device to display a selection image for allowing the operator to select a desired operation among the one or more operations and a desired remote manipulating device among the one or more remote manipulating devices,
transmitting the display data to the information terminal device of the operator and causing the information terminal device to display the selection image;
receiving from the information terminal device a selection instruction of the operator who selects the desired operation and the desired remote manipulating device via the selection image; and
receiving an operation order acceptance by storing an identifier of the operator, an identifier of the remote manipulating device designated by the selection instruction, and the operation designated by the selection instruction in combination with one another,
wherein
the selection image includes an operation selection image and an operation schedule image,
the operation selection image shows job items and operation time segments in combination with each other, and
the operation schedule image shows one or more operation time segments selected by the operator from an operation time set shown in the operation selection image and each of the job items in combination with each other,
the method includes receiving from the information terminal device a search criterion made by the operator to the remote manipulating device, and extracting, from a database, a remote manipulating device that meets the search criterion,
the selection image includes a search result view showing the extracted remote manipulating device,
the remote manipulating device information includes information of a location of the remote manipulating device, and
the search criterion includes a criterion of searching the remote manipulating device in order of a short distance thereto from a position of the information terminal device based on location information provided from a global positioning system (GPS) sensor included in the information terminal device,
wherein
the operation request information further includes a required skill level required for the operator under the order acceptance,
the operation selection system includes an operator database which stores respective skill levels of a plurality of operators, wherein a time required to complete any of the plurality of job items is automatically received based on actual performance by the plurality of operators on a job simulator, and the method includes acquiring from the operator database the skill level of the operator having sent the selection instruction among the plurality of operators when the second communication part receives the selection instruction, and automatically accepting the order acceptance of the operator when a condition of skill level equal to or higher than the required skill level in a case where the selection instruction indicates the acceptance, and notifying the operator of failed acceptance of the order acceptance when a condition of skill level is not equal to or higher than the required skill level.

* * * * *